(12) United States Patent
Yamasaki et al.

(10) Patent No.: US 9,000,633 B2
(45) Date of Patent: Apr. 7, 2015

(54) DRIVE APPARATUS HAVING A MOTOR, A HEAT SINK, AND A PLURALITY OF SEMICONDUCTOR MODULES

(75) Inventors: Masashi Yamasaki, Obu (JP); Atsushi Furumoto, Nukata-gun (JP); Hideki Kabune, Nagoya (JP)

(73) Assignee: Denso Corporation, Kariya (JP)

( * ) Notice: Subject to any disclaimer, the term of this patent is extended or adjusted under 35 U.S.C. 154(b) by 495 days.

(21) Appl. No.: 13/379,096

(22) PCT Filed: Jun. 23, 2010

(86) PCT No.: PCT/JP2010/004158
§ 371 (c)(1),
(2), (4) Date: Dec. 19, 2011

(87) PCT Pub. No.: WO2010/150529
PCT Pub. Date: Dec. 29, 2010

(65) Prior Publication Data
US 2012/0098361 A1    Apr. 26, 2012

(30) Foreign Application Priority Data

Jun. 24, 2009 (JP) .................................. 2009149650
Jan. 26, 2010 (JP) .................................. 2010014393
May 21, 2010 (JP) .................................. 2010117683

(51) Int. Cl.
*H02K 11/04* (2006.01)
*H02K 11/00* (2006.01)
(Continued)

(52) U.S. Cl.
CPC .......... *H02K 11/0073* (2013.01); *B62D 5/0406* (2013.01); *H02K 5/225* (2013.01); *H02K 2211/03* (2013.01)

(58) Field of Classification Search
CPC ..... H02K 5/22; H02K 5/225; H02K 11/0068; H02K 11/0073; H02K 11/04
USPC .............................................. 310/64, 68 R, 71
See application file for complete search history.

(56) References Cited

U.S. PATENT DOCUMENTS

| 4,988,905 A | 1/1991 | Tolmie, Jr. |
| 5,406,154 A | 4/1995 | Kawaguchi et al. |

(Continued)

FOREIGN PATENT DOCUMENTS

| JP | 3-89837 | 4/1991 |
| JP | 9-123929 | 5/1997 |

(Continued)

OTHER PUBLICATIONS

Office Action (12 pages) dated Oct. 18, 2013, issued in copending U.S. Appl. No. 13/380,309.

(Continued)

*Primary Examiner* — Michael Andrews
(74) *Attorney, Agent, or Firm* — Nixon & Vanderhye P.C.

(57) ABSTRACT

A heat sink has two heat radiation blocks. The heat radiation block is formed in a wide column shape. The heat radiation block has connection parts at both ends. The connection parts have respective holes formed to pass through in the axial direction of a motor. One screw is inserted in one connection part and threaded into a motor case. The other screw is inserted in the other connection part and threaded into the motor case together with a cover. A power module forming an inverter circuit of each of two power supply systems is arranged on each heat radiation blocks.

15 Claims, 23 Drawing Sheets

(51) Int. Cl.
*B62D 5/04* (2006.01)
*H02K 5/22* (2006.01)

(56) References Cited

U.S. PATENT DOCUMENTS

| | | | |
|---|---|---|---|
| 5,500,563 A * | 3/1996 | Kawaguchi et al. | 310/68 R |
| 5,552,988 A | 9/1996 | Kawaguchi et al. | |
| 5,932,942 A | 8/1999 | Patyk et al. | |
| 5,952,751 A | 9/1999 | Yamakoshi et al. | |
| 6,081,056 A | 6/2000 | Takagi et al. | |
| 6,577,030 B2 | 6/2003 | Tominaga et al. | |
| 6,593,674 B2 | 7/2003 | Sanchez et al. | |
| 6,704,201 B2 | 3/2004 | Kasuga | |
| 7,207,187 B2 | 4/2007 | Funahashi et al. | |
| 2002/0060105 A1 | 5/2002 | Tominaga et al. | |
| 2003/0047304 A1 * | 3/2003 | Kasuga | 361/710 |
| 2004/0090130 A1 | 5/2004 | Kaneko et al. | |
| 2005/0167183 A1 | 8/2005 | Tominaga et al. | |
| 2006/0208582 A1 | 9/2006 | Marioni | |
| 2006/0261689 A1 | 11/2006 | Natsuhara et al. | |
| 2008/0106160 A1 * | 5/2008 | Yoshinari et al. | 310/68 D |
| 2008/0127463 A1 | 6/2008 | Zhao et al. | |
| 2010/0225307 A1 | 9/2010 | Takahashi | |
| 2011/0286185 A1 * | 11/2011 | Abe et al. | 361/710 |
| 2012/0104886 A1 * | 5/2012 | Yamasaki et al. | 310/71 |

FOREIGN PATENT DOCUMENTS

| | | |
|---|---|---|
| JP | 10-234158 | 9/1998 |
| JP | 10-322973 | 12/1998 |
| JP | 2000-174203 | 6/2000 |
| JP | 2002-120939 | 4/2002 |
| JP | 2002-345211 | 11/2002 |
| JP | 2005-73373 | 3/2005 |
| JP | 2005-073392 | 3/2005 |
| JP | 2005-176451 | 6/2005 |
| JP | 2007-288929 | 11/2007 |
| JP | 2008-29093 | 2/2008 |
| JP | 2008-141881 | 6/2008 |
| JP | 2008-270293 | 11/2008 |
| JP | 2009-113526 | 5/2009 |

OTHER PUBLICATIONS

Office Action (7 pages) dated Dec. 24, 2013, issued in corresponding Chinese Application No. 201210013678.4 and English translation (13 pages).
U.S. Appl. No. 13/380,321, M. Yamasaki et al., filed Dec. 22, 2011.
U.S. Appl. No. 13/379,118, M. Yamasaki et al., filed Dec. 19, 2011.
U.S. Appl. No. 13/380,309, M. Yamasaki et al., filed Dec. 22, 2011.
U.S. Appl. No. 13/336,492, M. Yamasaki et al., filed Dec. 23, 2011.
Office Action (14 pages) dated Feb. 28, 2014, issued in copending U.S. Appl. No. 13/380,309.
Office Action (14 pgs.) dated Aug. 14, 2013 issued in co-pending U.S. Appl. No. 13/336,492.
Office Action (2 pages) dated Nov. 14, 2013, issued in corresponding Japanese Application No. 2010-117684 and English translation (3 pages).
International Search Report for PCT/JP2010/004158, mailed Sep. 28, 2010.
Written Opinion for PCT/JP2010/004158, mailed Sep. 28, 2010 (w/ English Translation).
Office Action (2 pages) dated Jul. 19, 2013, issued in copending Japanese Application No. 2010-117683 and English translation (3 pages).
Office Action (3 pages) dated Jul. 19, 2013, issued in copending Japanese Application No. 2010-117684 and English translation (4 pages).
Office Action (2 pages) dated Jul. 19, 2013, issued in copending Japanese Application No. 2010-117685 and English translation (3 pages).
Office Action (2 pages) dated Jul. 19, 2013, issued in copending Japanese Application No. 2010-117686 and English translation (3 pages).
Office Action (8 pages) dated Jun. 4, 2013, issued in copending Chinese Application No. 201080028216.9 and English translation (14 pages).
Office Action (6 pages) dated Jun. 4, 2014, issued in corresponding Chinese Application No. 201080028288.3 and English translation (11 pages).
Office Action (7 pages) dated May 21, 2014, issued in corresponding Chinese Application No. 201080028284.5 and English translation (9 pages).
Second Office Action in CN 201210013678.4 dated Jul. 25, 2014 (with partial English translation).
Office Action (17 pages) dated Apr. 16, 2014, issued in corresponding Chinese Application No. 201080028286.4 and English translation (29 pages).
Advisory Action (3 pages) dated Jun. 11, 2014 issued in co-pending U.S. Appl. No. 13/380,309.
Office Action (2 pages) dated Sep. 30, 2014 issued in corresponding Japanese Application No. 2013-254922 and English translation (2 pages).
Office Action mailed Sep. 10, 2014 in U.S. Appl. No. 13/379,118, pp. 1-31.
Office Action mailed Oct. 21, 2014, issued in corresponding U.S. Appl. No. 13/380,309 (18 pages).

* cited by examiner

DRIVE APPARATUS HAVING A MOTOR, A HEAT SINK, AND A PLURALITY OF SEMICONDUCTOR MODULES

CROSS REFERENCE TO RELATED APPLICATIONS

This application is the U.S. national phase of International Application No. PCT/JP2010/004158 filed 23 Jun. 2010 which designated the U.S. and claims priority to Japanese Patent Applications No. 2009-149650 filed on Jun. 24, 2009, No. 2010-14393 filed on Jan. 26, 2010 and No. 2010-117683 filed on May 21, 2010, the disclosures of which are incorporated herein by reference.

TECHNICAL FIELD

The present invention relates to a drive apparatus, which has an electric motor and an electronic control unit for controlling driving of the electric motor.

BACKGROUND ART

In recent years, an electric power steering system (EPS system) that generates torque electrically is used as a mechanism for assisting a vehicle steering operation. Different from a hydraulic power steering system, the EPS system assists the vehicle steering operation only when a steering operation is performed by a driver. Therefore, the EPS system provides many advantages such as low-fuel consumption.

A motor provided in the EPS system generates torque. For example, a brushless motor, which is driven to rotate by supplying a three-phase AC current, is used in the EPS system. In a case where the brushless motor is used in the EPS system, a DC output supplying a predetermined voltage (for example, 12V) needs to be converted to a phase-shifted AC output in order to supply phase-shifted current to multi-phase (for example, three-phase) coils of the brushless motor. Thus, an electronic control unit is needed to switch over current supply to motor coils. The electronic control unit includes a semiconductor module which performs switching operation.

In a conventional drive apparatus, the electronic control unit is located near an electric motor (for example, disclosed in following patent documents No. 1 to No. 4). Since the semiconductor module generates heat due to large current, arrangement of the semiconductor module relative to a heat sink need be taken into consideration.

PRIOR ART DOCUMENT

Patent Document

Patent document No. 1: JP-A-2002-120739
Patent document No. 2: JP-A-H10-234158
Patent document No. 3: JP-A-H10-322973
Patent document No. 4: JP-A-2004-159454

Coil currents of different phases are supplied to coils of a plurality of phases (for example, three phases). In some cases, a motor is controlled by a plurality of power supply systems. In this case, a plurality of coils of a plurality of phases is provided for each power supply system, and an inverter circuit is provided for the coils of the plurality of phases. The inverter circuit is formed as a semiconductor module. With the plurality of power supply systems, even when one inverter circuit (semiconductor module) for controlling one coil fails, the motor can be continuously operated by normally controlling the other coil.

According to patent document No. 1, a semiconductor module is mounted on a metal substrate. Therefore, if inverter circuits of a plurality of power supply systems are formed on the metal substrate, other semiconductor modules of the other power supply systems are thermally affected. As a result, it may occur that the plurality of power supply systems fail at the same time.

According to patent document No. 2, semiconductor modules are arranged together at an open part of a heat sink. According to patent document No. 3, as well, semiconductor modules are accommodated in a chamber formed in a motor. Thus it may also occur that the plurality of power supply systems fail at the same time.

According to patent document No. 3, semiconductor modules are arranged around a stator of a motor and hence the motor necessarily becomes large in size in the radial direction. Here, a flat-shaped smoothing capacitor is used. Under a condition where a cylindrical capacitor need be used, the motor further becomes large in size in the radial direction.

SUMMARY OF INVENTION

It is an object of the present invention to provide a drive apparatus, which includes an integrated unit of a motor and an electronic control unit for controlling the motor, and protects power supply systems from failing at the same time.

According to the present invention, a drive apparatus comprises a motor, a heat sink and semiconductor modules. The motor has a motor case formed in a cylindrical shape to define an outer periphery, a stator located radially inside the motor case and wound with winding wires to provide a plurality of phases, a rotor located radially inside the stator and rotatable relative to the stator, and a shaft rotatable together with the rotor. The heat sink is arranged in an axial direction of the motor case and has a plurality of column-shaped parts separated one another. The semiconductor modules are provided for a plurality of power supply systems, each of which switches over coil currents supplied to the winding wires, and arranged on the plurality of column-shaped parts such that one power supply system corresponds to one column-shaped part.

DESCRIPTION OF EMBODIMENTS

Figure 1:
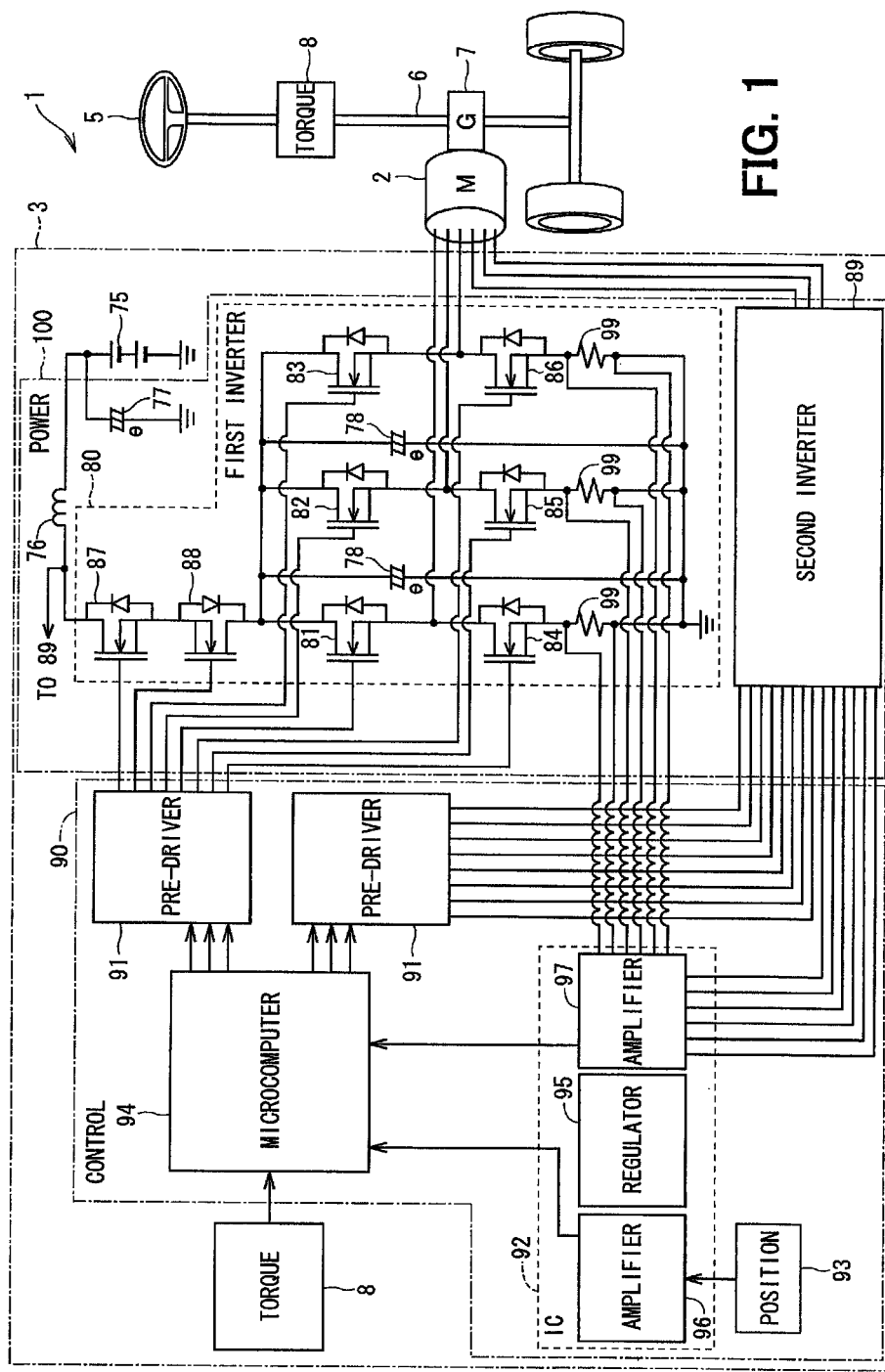
FIG. 1 is a block diagram showing a power steering system using a drive apparatus according to a first embodiment of the present invention.

Embodiments of a drive apparatus having a built-in electronic control unit according to the present invention will be described with reference to the accompanying drawings. In each of the following embodiments, the same or equivalent reference number is added to the same or equivalent parts in the drawings.

First Embodiment

A drive apparatus 1 according to a first embodiment of the present invention is shown in FIGS. 1 to 19.

The drive apparatus 1 is applied to an electric power steering system (EPS). The drive apparatus 1 is a motor apparatus with a built-in electronic control unit. The drive apparatus has a motor 2 and an electronic control unit 3. The electronic control unit 3 has a control circuit substrate 40 as a control wiring part, a heat sink 50, a power module 60, a power circuit substrate 70 as a power wiring part and the like (see FIGS. 5 and 6)

As shown in FIG. 1, the drive apparatus 1 is used to assist vehicle steering operation by a steering wheel 5 of a vehicle by driving a column shaft 6 to generate rotational torque through a gear 7 attached to the column shaft 6, which is a rotational shaft of the steering wheel 5. Specifically, when the steering wheel 5 is operated by a driver, the drive apparatus 1 assists the steering operation of the driver on the steering wheel 5 by detecting steering torque generated in the column shaft 6 and acquiring vehicle speed information from CAN (controller area network), which is not shown. The steering torque is detected by a torque sensor 8. It is also possible to use this mechanism for not only assisting steering operation but also other operations depending on different control processing. The other operations have automatic control of the steering wheel 5 such as lane keeping on an expressway, guiding to a parking space in a parking lot and the like.

The motor 2 is a brushless motor, which rotates the gear 7 in forward and reverse directions. The electronic control unit 3 controls current supply to the motor 2 and drive operation of the motor 2. The electronic control unit 3 has a power circuit 100, which supplies drive currents to drive the motor 2, and a control circuit 90, which controls driving of the motor 2, that is, supply of the drive currents from the power circuit 100 to the motor 2.

The power circuit 100 has a choke coil 76 provided between a DC power source 75 and a power supply line, a capacitor 77 and two sets of (first and second) inverter circuits 80 and 89. The inverter circuits 80 and 89 have the same configuration, and hence only the first inverter circuit 80 is described below.

The first inverter circuit 80 has MOSFETs (metal-oxide-semiconductor field-effect transistors referred to as MOSs) 81 to 86. Each of the MOSs 81 to 86 is turned on (conduction) or off (non-conduction) between a source-drain path depending on a gate potential thereof. The MOSs 81 to 86 are switching elements.

The MOS 81 has a drain connected to the power supply line side and a source connected to a drain of the MOS 84. The MOS 84 has a source connected to the ground. A junction between the MOS 81 and the MOS 84 is connected to a U-phase coil of the motor 2.

The MOS 82 has a drain connected to the power supply line side and a source connected to a drain of the MOS 85. The MOS 85 has a source connected to the ground. A junction between the MOS 82 and the MOS 85 is connected to a V-phase coil of the motor 2.

The MOS 83 has a drain connected to the power supply line side and a source connected to a drain of the MOS 86. The MOS 86 has a source connected to the ground. A junction between the MOS 83 and the MOS 86 is connected to a W-phase coil of the motor 2.

The inverter circuit 80 has power supply relays 87 and 88. The power supply relays 87 and 88 are formed of MOSs similar to the MOSFETs 81 to 86. The power supply relays 87 and 88 are provided in series between the MOSs 81 to 83 and the power source 75 to interrupt current flowing at the time of occurrence of abnormality. Further, the power supply relay 87 is provided to interrupt currents from flowing to the motor 2 side when a disconnection or short-circuit happens. The power supply relay 88 is provided to protect circuit components by interrupting reverse currents from flowing to circuit components when an electronic component such as the capacitor 77 is connected in reverse by mistake.

The shunt resistors 99 are electrically connected between the MOSs 84 to 86 and the ground. Currents flowing in the U-phase coil, the V-phase coil and the W-phase coil of the motor 2 are detected by detecting voltages developed by or currents flowing in the shunt resistors 99.

The choke coil 76 and the capacitor 77 are electrically connected between the power source 75 and the power supply relay 87. The choke coil 76 and the capacitor 77 form a filter circuit to reduce noise applied from other devices, which share the power source 75, and reduce noise applied from the drive apparatus 1 to other devices, which share the power source 75.

Capacitors 78 are electrically connected between power source sides of the MOSs 81 to 83 provided at the power supply line side and ground sides of the MOSs 84 to 86 provided at the ground side. The capacitors 78 assist electric power supply to the MOSs 81 to 86 and suppress noise components such as surge voltages by storing electric charge.

The control circuit 90 has a pre-driver circuit 92, a customized IC 92, a position sensor 93 as a rotation detection part and a microcomputer 94. The customized IC 92 has, as functional blocks, a regulator circuit 95, a position sensor signal amplifying circuit 96 and a detection voltage amplifying circuit 97.

The regulator circuit 95 is a stabilizing circuit for stabilizing power supply. The regulator circuit 95 stabilizes electric power supplied to each part. For example, the microcomputer 94 is operated with a predetermined voltage (for example, 5V), which is stabilized by the regulator circuit 95.

A signal from the position sensor 93 is applied to the position sensor signal amplifying circuit 96. The position sensor 93 detects a rotational position of the motor 2 and the rotational position signal is applied to the position sensor signal amplifying circuit 96. The position sensor signal amplifying circuit 96 amplifies and outputs the rotation position signal to the microcomputer 94.

The detection voltage amplifying circuit 97 detects voltages applied to the shunt resistors 99 and amplifies and outputs the terminal voltages of the shunt resistors 99 to the microcomputer 94.

The rotation position signal of the motor 2 and the terminal voltages of the shunt resistors 99 are inputted to the microcomputer 94. A steering torque signal is also inputted to the microcomputer 94 from the torque sensor 8 attached to the column shaft 6. The vehicle speed information is inputted to the microcomputer 94 through CAN. The microcomputer 94 controls, based on the steering torque signal and the vehicle speed information, the inverter circuit 80 through the pre-driver circuit 91 in correspondence to the rotation position signal so that the steering operation by the steering wheel 5 is power-assisted in correspondence to the vehicle travel speed. Specifically, the microcomputer 94 controls the inverter circuit 80 by switching over on/off states of the MOSs 81 to 86 through the pre-driver circuit 91. Since the gates of six MOSs 81 to 86 are connected to six output terminals of the pre-driver circuit 91, the on/off states of the MOSs 81 to 86 are switched over by changing the gate voltages by the pre-driver circuit 91.

The microcomputer 94 controls the inverter circuit 80 in accordance with the terminal voltages of the shunt resistors 99, which are inputted from the detection voltage amplifying circuit 97, so that the current supplied to the motor 2 is approximated in a sinusoidal waveform. The control circuit 90 also controls the inverter circuit 89 in the similar manner as controlling the inverter circuit 80.

Figure 2:
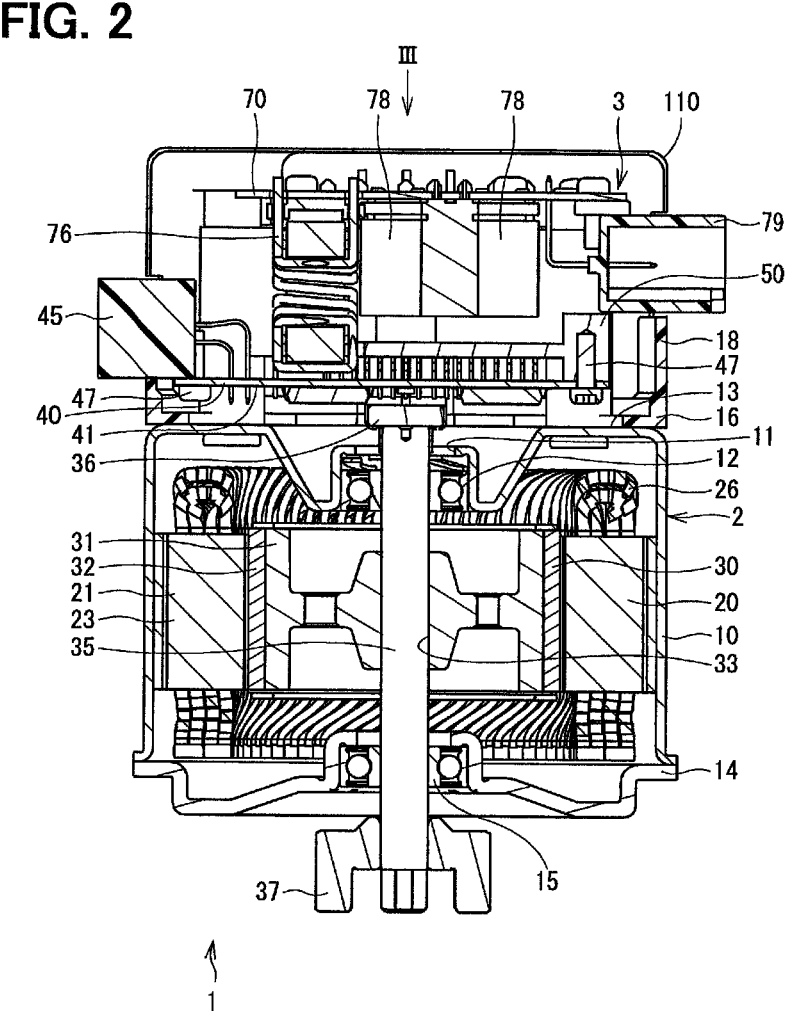
FIG. 2 is a cross-sectional view of the drive apparatus according to the first embodiment of the present invention.
Figure 3:
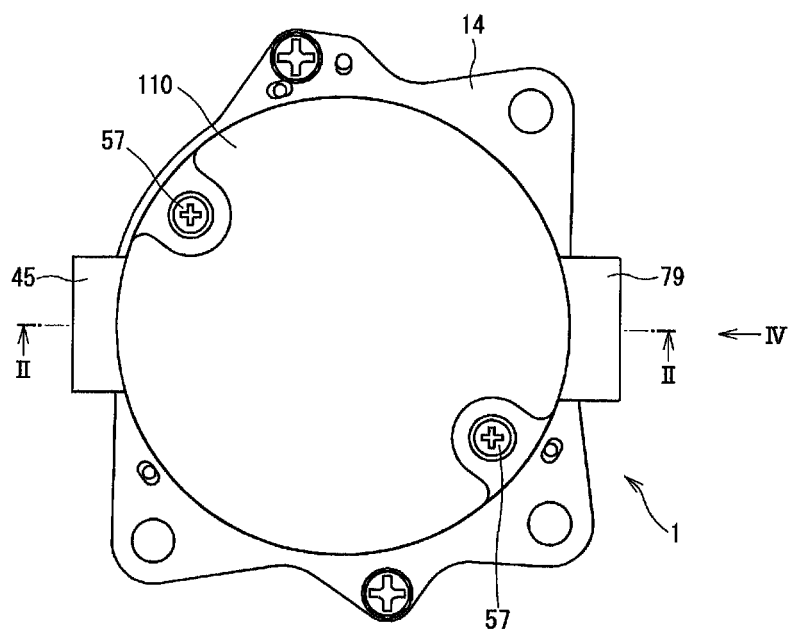
FIG. 3 is a plan view of the drive apparatus according to the first embodiment of the present invention.
Figure 4:
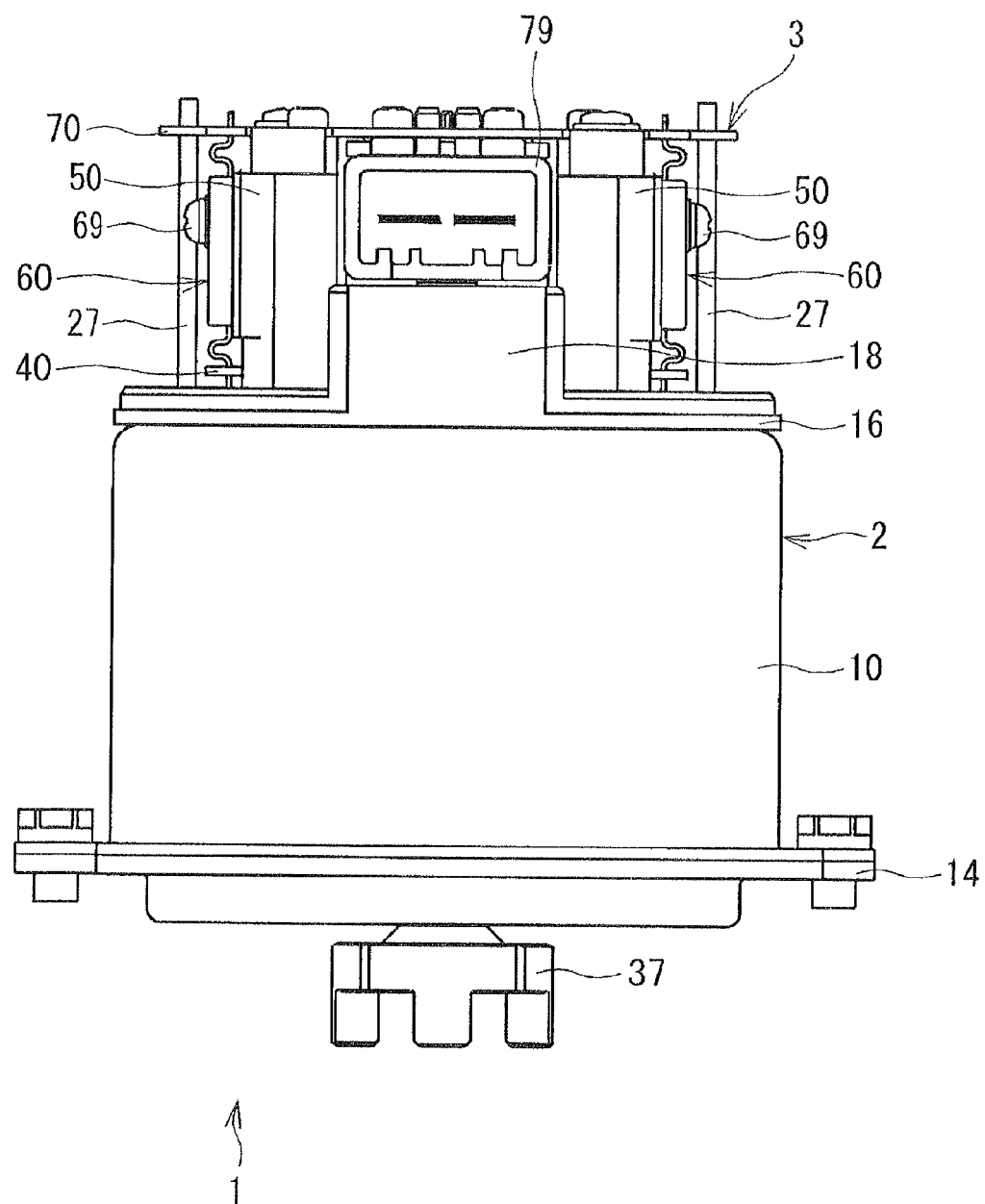
FIG. 4 is a side view of the drive apparatus viewed in a direction IV in FIG. 3 under a condition that a cover is removed.

As shown in FIG. 2, the electronic control unit 3 is located at one end in an axial direction of the motor 2. The drive apparatus 1 thus has a stack structure in which the motor 2 and the electronic control unit 3 are stacked in the axial direction of the motor 2.

The motor 2 has a motor case 10, a stator 20, a rotor 30, a shaft 35 and the like.

The motor case 10 is formed in a cylindrical shape and made of iron or the like. An end frame 14 made of aluminum is tightly fixed to the motor case 10 at an axial end part, which is opposite to the electronic control unit 3, by screws or the like. An opening 11 is provided in the motor case 10 at the axial center of an end part, which is on the electronic control unit 3 side. The shaft 35 passes through the opening 11.

A resin guide 16 is provided at the end part of the motor case 10, which is at the electronic control unit 3 side. The resin guide 16 is formed in a substantially annular shape having its central part, which is open.

The stator 20 is located inside the motor case 10 in a radial direction. The stator 20 has twenty protruded salient poles 21, which are located inside the motor case 10 in the radial direction. The salient poles 21 are uniformly distributed on a circumference of the motor case 10. The salient pole 21 has a stacked iron core 23, which is stack of thin plates of magnetic material, and an insulator, which is fitted to the outside of the stacked iron core 23 in a radial direction. The insulators are not shown in the drawings. Winding wires 26 are wound on the insulators. The winding wires 26 form three-phase winding wires, which have a U-phase coil, a V-phase coil and a W-phase coil.

The rotor 30 is located radially inside the stator 20 so that it is rotatable relative to the stator 20. The rotor 30 is formed of magnetic material such as iron in a cylindrical shape. The rotor 30 has a rotor core 31 and permanent magnets 32 located radially outside the rotor core 31. The permanent magnets 32 are arranged so that N-pole and S-pole alternate in a circumferential direction.

The shaft 35 is fixed in a shaft hole 33 formed in the axial center of the rotor core 31. The shaft 35 is supported rotatably by a bearing 12 provided in the motor case 10 and a bearing 15 provided in the end frame 14. Thus the shaft 35 is rotatable with the rotor 30 relative to the stator 20.

The shaft 35 has a magnet 36 at its axial end part, which is at the electronic control unit 3 side. Since the electronic control unit 3 side of the shaft 35 is inserted through the opening 11 of the motor case 10, the magnet 36 fixed to the axial end part of the shaft 35 at the electronic control unit 3 side is exposed towards the electronic control unit 3 side. The shaft 35 does not pass through the control circuit substrate 40. The magnet 36 is located near an end surface 41 of the control circuit substrate 40, which is at the motor 2 side, facing the end surface 41.

The shaft 35 has an output end 37 at an end position, which is opposite to the electronic control unit 3 relative to the motor case 10. A gear box, which is not shown, is provided on a side of the shaft 35, which is the opposite side of the electronic control unit 3. The gear 7 (see FIG. 1) is provided in the gear box. The gear 7 is coupled to the output end 37, and is driven to rotate by driving force outputted from the shaft 35.

Figure 5:
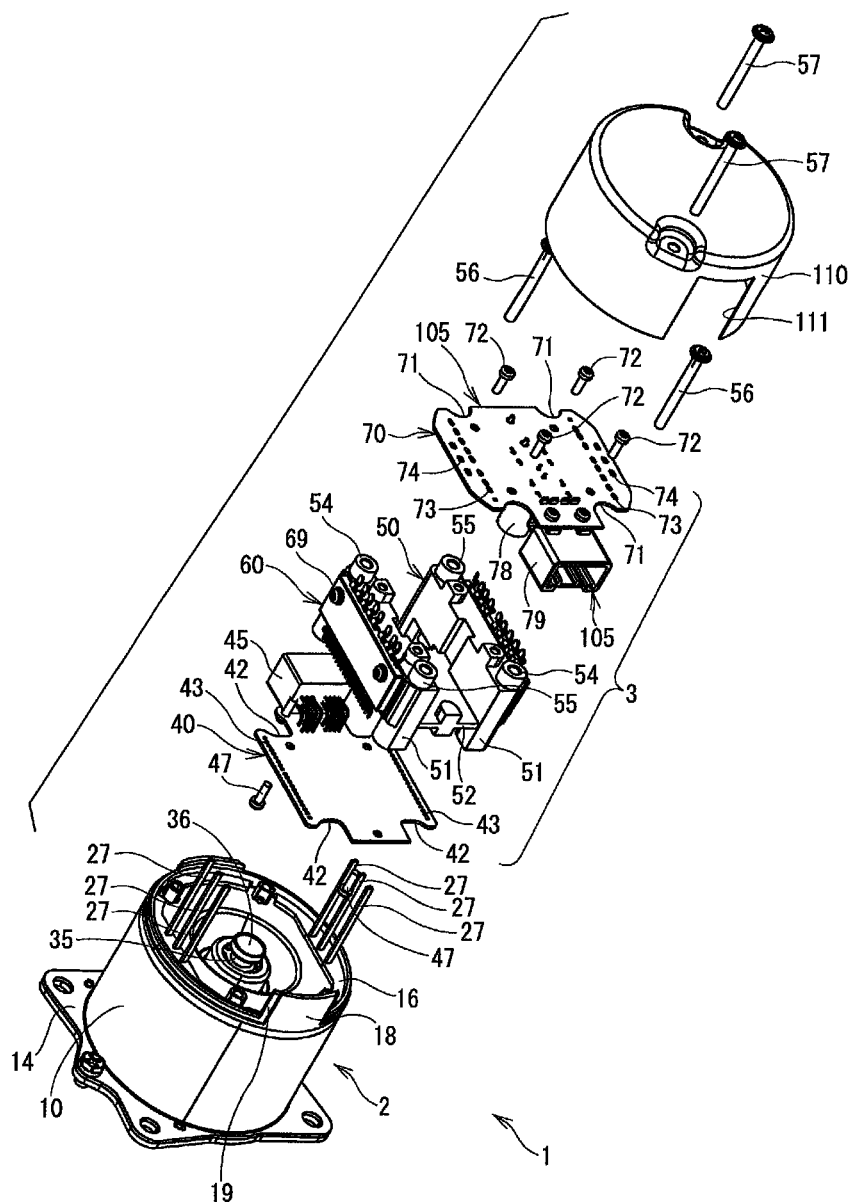
FIG. 5 is an exploded perspective view of the drive apparatus according to the first embodiment of the present invention.
Figure 6:
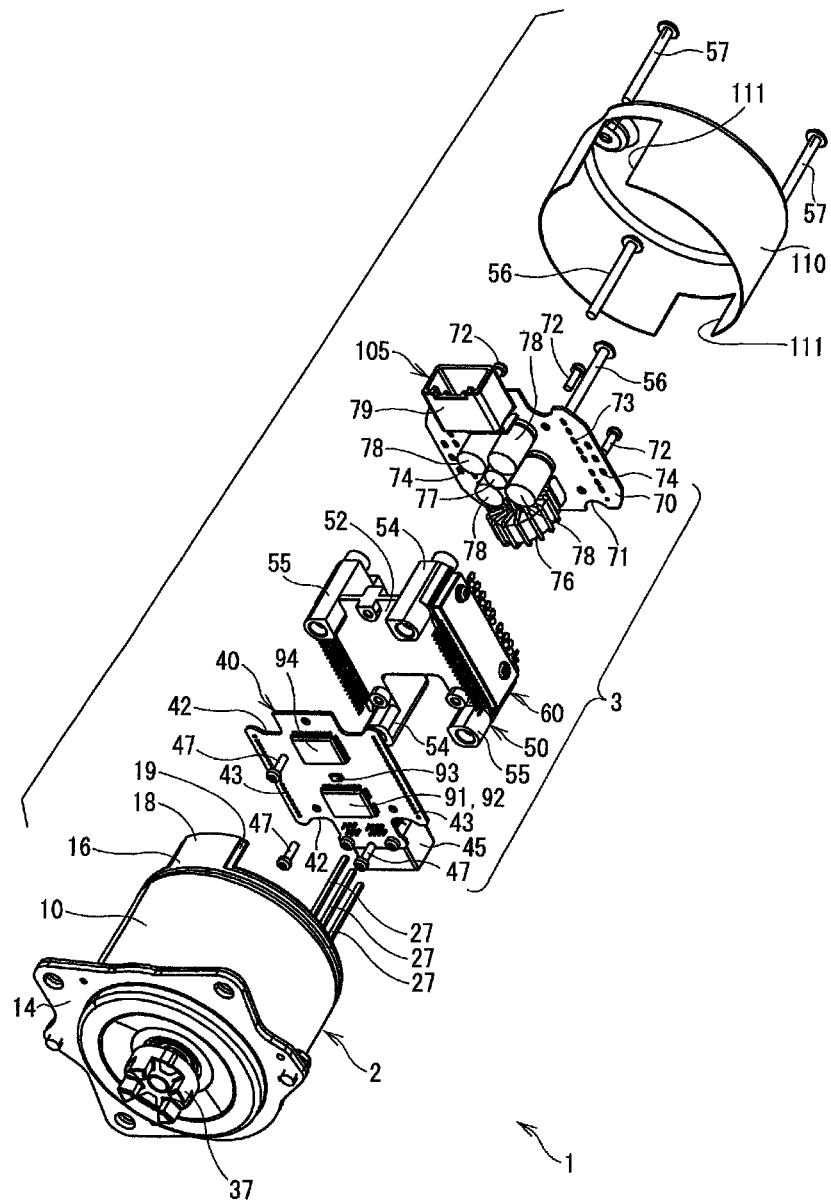
FIG. 6 is another exploded perspective view of the drive apparatus according to the first embodiment of the present invention.
Figure 7:
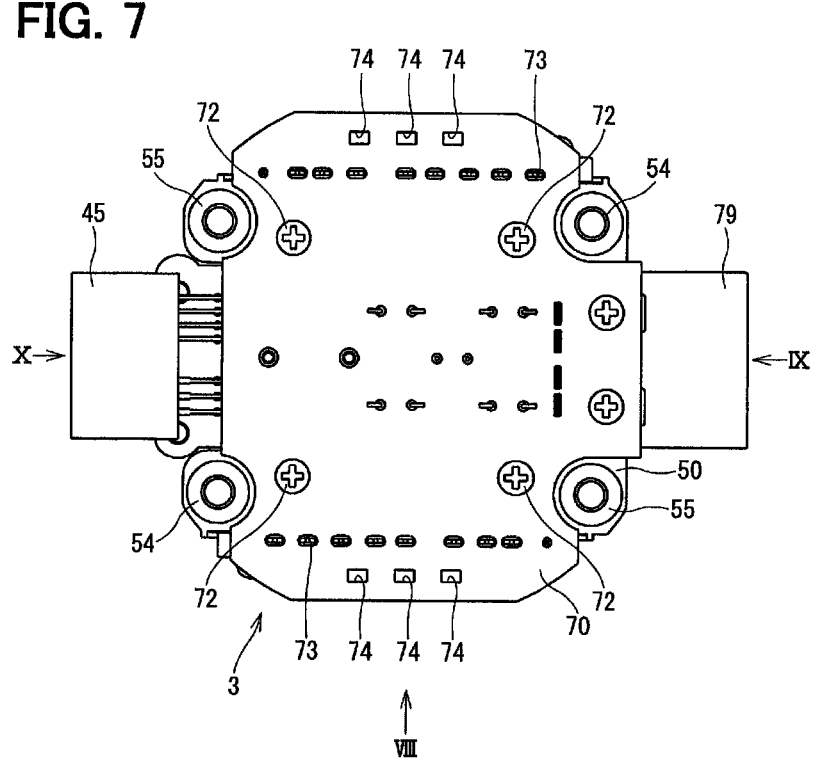
FIG. 7 is a plan view of an electronic control unit according to the first embodiment of the present invention.
Figure 8:
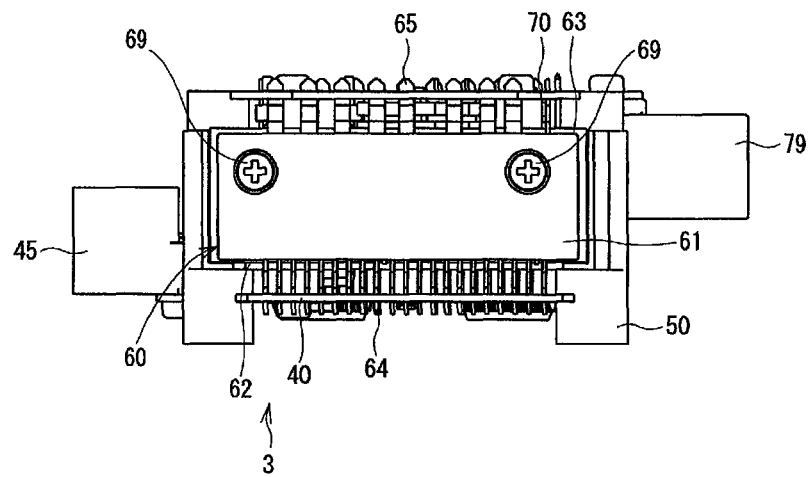
FIG. 8 is a side view of the electronic control unit viewed in a direction VIII in FIG. 7.
Figure 9:
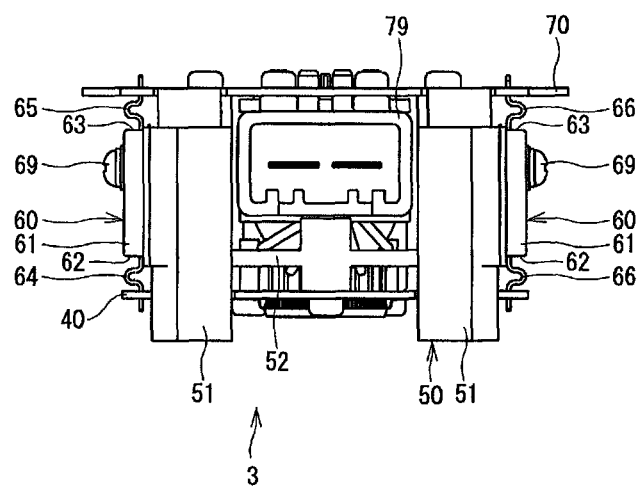
FIG. 9 is a side view of the electronic control unit viewed in a direction IX in FIG. 7.

As shown in FIGS. 5 and 6, the winding wires 26 are taken out from six locations to form motor leads (lead wires) 27. The motor leads 27 pass through six holes 17 formed in the resin guide 16. Thus, the motor leads 27 are positioned by the resin guide 16 and surely insulated from the motor case 10. The motor leads 27 are taken out towards the electronic control unit 3 and connected to the power circuit substrate 70 through the control circuit substrate 40 and a radially outside part of the power module 60. That is, the motor leads 27 are located radially outside the power module 60 when viewed in the axial direction of the motor 2. The motor leads 27 extend to the power circuit substrate 70 across the power module 60 in a radial outside region of the power module 60.

As shown in FIGS. 5 and 6, the electronic control unit 3 is provided within a motor case area in the radial direction of the motor 2. The motor case area is formed when the motor case 10 is projected in the axial direction. From the motor 2 side, the electronic control unit 3 has the control circuit substrate 40, the heat sink 50 and the power module 60, and the power circuit substrate 70 in the axial direction of the motor 2 arranged in this order.

The control circuit substrate 40 is a substrate of four layers formed of, for example, glass epoxy substrate and formed in a generally rectangular plate shape so that it is within the motor case area. The four corners of the control circuit substrate 40 are formed four notches 42 for assembling the heat sink 50 to the motor case 10. The control circuit substrate 40 is screw-fitted to the heat sink 50 from the motor 2 side by screws 47.

The control circuit substrate 40 has a variety of electronic components, which form the control circuit 90 and are mounted on the control circuit substrate 40. The pre-driver circuit 91, the customized IC 92, the position sensor 93 and the microcomputer 94 are mounted on the surface of the control circuit substrate 40 at the motor 2 side.

The position sensor 93 is provided generally at the center of the control circuit substrate 40 in facing relation to the magnet 36 of the shaft 35. With this arrangement, rotation of the shaft 35 is detected by detecting changes in magnetic field provided by the magnet 36, which rotates with the shaft 35. The control circuit substrate 40 also has a plurality of through holes 43 formed along the outer periphery of both ends of longer sides. The through holes 43 are for connection to control terminals 64 of the power module 60. A control connector 45 is attached to the control circuit substrate 40 on the opposite side of the motor 2. The control connector 45 is located at one end of shorter side of the control circuit substrate 40. The control connector 45 is configured to be connected with wires from the radial outside region of the motor 2 and sensor information from various sensors is inputted to the control connector 45.

The heat sink 50 has two heat radiation blocks 51 as column-shaped parts formed to be distanced or spaced apart from each other. A connection part 52 is provided between the two heat radiation blocks 51. The two heat radiation blocks 51 and the connection part 52 are formed integrally of good thermal conductivity, for example, aluminum. The heat radiation blocks 51 are located radially outside a central line of the motor 2, which is an imaginary extension line of an axial line of the shaft 35.

Figure 10:
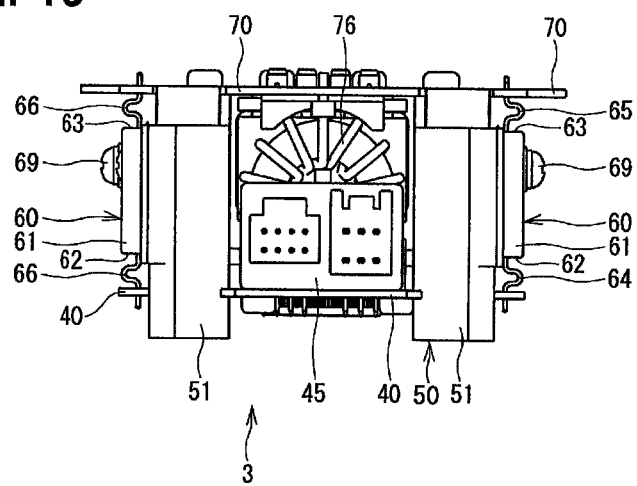
FIG. 10 is a side view of the electronic control unit viewed in a direction X in FIG. 7.
Figure 11:
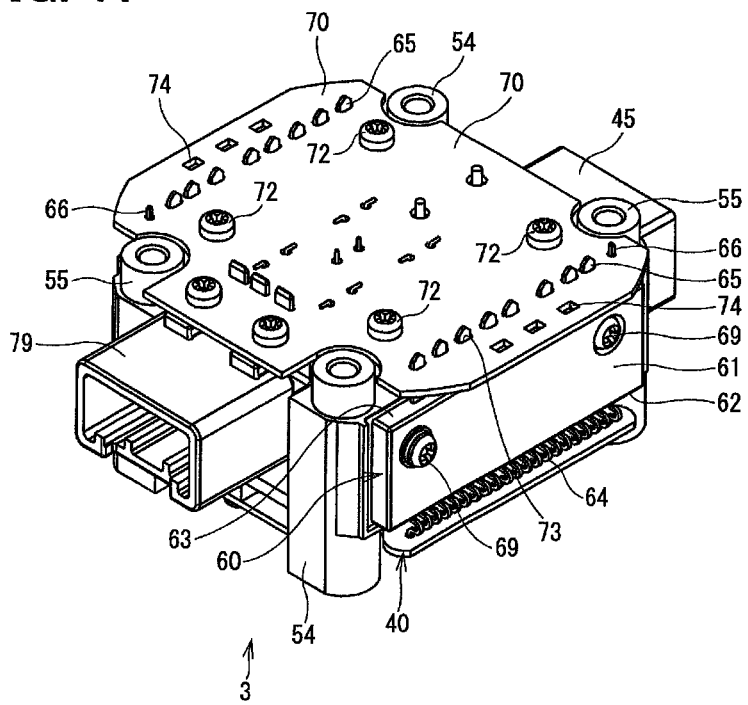
FIG. 11 is a perspective view of the electronic control unit according to the first embodiment of the present invention.
Figure 12:
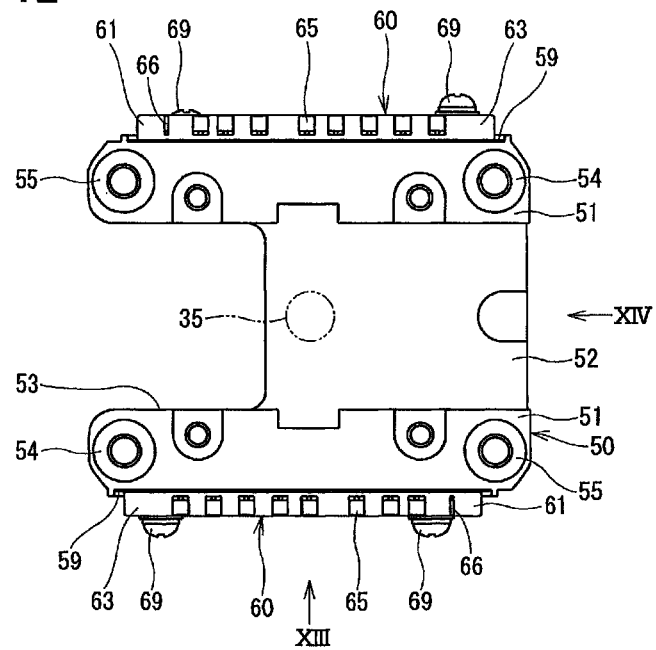
FIG. 12 is a plan view of the power circuit substrate, in which a power module is assembled to a heat sink, according to the first embodiment of the present invention.
Figure 13:
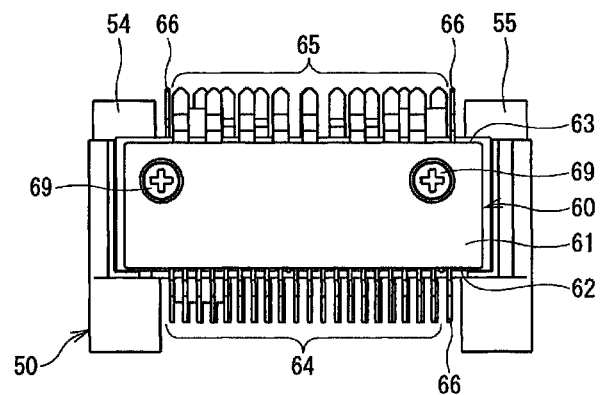
FIG. 13 is a side view of the heat sink viewed in a direction XIII in FIG. 12.
Figure 14:
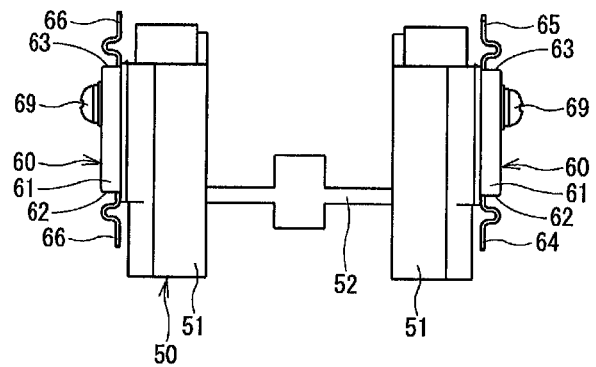
FIG. 14 is a side view of the heat sink viewed in a direction XIV in FIG. 12.
Figure 15:
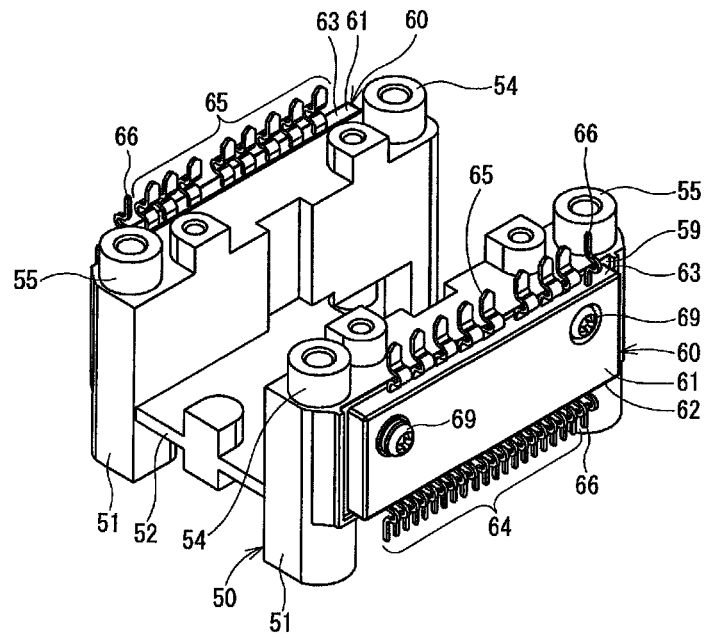
FIG. 15 is a perspective view of the heat sink, in which the power module is assembled to the heat sink, according to the first embodiment of the present invention.

As shown in FIG. 14, the heat sink 50 is formed generally in an H-shape when viewed in a direction XIV in FIG. 12. As shown in FIG. 12, the heat sink 50 is formed in an open-square shape when viewed in the axial direction of the motor 2. As shown in FIG. 10, the control connector 45 is inserted to a concave part 53, which is formed by radially inside surfaces of the two heat radiation blocks 51 and the connection part 52.

The heat radiation blocks 51 are each formed in a wide column shape. Each heat radiation block 51 has connection parts 54 and 55 at its both ends. The connection parts 54 and 55 are formed through holes in the axial direction of the motor 2. Screws 56 are inserted in the connection part 54 and threaded into the motor case 10. Further, screws 57 are inserted into the connection part 55 and threaded into to the motor case 10 together with a cover 110. The connection part 54 of one heat radiation block 51 and the connection part 54 of the other heat radiation block 51 are arranged to be in point-symmetry relative to the central line of the shaft 35. Similarly, the connection part 55 of one heat radiation block 51 and the connection part 55 of the other heat radiation block 51 are arranged to be in point-symmetry relative to the central line of the shaft 35.

A heat receiving surface 59 has a wide wall surface formed on the radially outside surface of the heat radiation block 51 in the radial direction of the motor case 10. The heat receiving surface 59 is arranged in a rising direction from an end surface of the motor case 10 formed in the axial direction. The heat receiving surface 59 is generally perpendicular to an end surface wall 13 of the motor case 10, which is formed in the axial direction of the motor case 10.

The power module 60 is provided on the radially outside surface of the heat sink 50 in the radial direction of the motor 2, and disposed along the heat receiving surface 59. That is, the power module 60 is provided longitudinally on the radially outside surface of the heat sink 50 in the radial direction of the motor 2. The power module 60 is disposed along each of the two heat radiation blocks 51.

The power module 60 has the control terminals 64 and power terminals 65. The control terminals 64 and the power terminals 65 are protruded from a mold part 61.

The control terminals 64 are formed on a first narrow end surface 62, which is perpendicular to the wide wall surface of the mold part 61. The power terminals 65 are formed on a second narrow end surface 63, which is perpendicular to the wide surface of the mold part 61 and faces the first narrow end surface 62 in parallel. The power module 60 is located longitudinally along the heat receiving surface 59 of the heat sink 50 in such a manner that the first end surface 62, on which the control terminals 64 are formed, is at the control circuit substrate 40 side, and the second end surface 63, on which the power terminals 65 are formed, is at the power circuit substrate 70 side. That is, the control terminals 64 are protruded facing the control circuit substrate 40 side and the power terminals 65 are protruded facing the power circuit substrate 70 side.

The control terminals 64 are inserted into the through holes 43 of the control circuit substrate 40 and electrically connected to the control circuit substrate 40 by soldering or the like. Control signals are outputted to the power module 60 from the control circuit substrate 40 through the control terminals 64. The power terminals 65 are inserted into the through holes 73, which are to be described below, formed in the power circuit substrate 70 and electrically connected to the power circuit substrate 70 by soldering or the like. The power terminals 65 carry the drive currents for the winding wires 26 to the power module 60. Only small currents (for example, 2 A), which are required to control driving the motor 2, are supplied to the control circuit substrate 40 side. On the other hand, large currents (for example, 80 A), which are required to drive the motor 2, are supplied to the power circuit substrate 70 side. Therefore, the power terminals 65 are formed thicker than the control terminals 64.

A control ground terminal 66 is formed to have the similar thickness as the control terminal 64. The ground terminal 66 passes through the mold part 61 and connects the control circuit substrate 40 to the ground of the power circuit substrate 70.

The power module 60 has MOSs 81 to 86, which are switched over on/off states to supply drive currents to the winding wires. The MOSs 81 to 86 are switching elements. The power module 60 is formed in such a manner that the switching elements MOSs 81 to 86, the power supply relays 87 and 88 and the shunt resistors 99 are mounted on a wiring pattern formed of copper, and are electrically connected with wires and the like, and are molded into the mold part 61. Two power modules 60 form the inverter circuits 80 and 89 shown in FIG. 1.

One power module 60 corresponds to the inverter circuit 80, and has the MOSs 81 to 86, the power supply relays 87, 88 and the shunt resistors 99 shown in FIG. 1. That is the MOSs 81 to 86, the power supply relays 87, 88 and the shunt resistors 99 are resin-molded into a single body as a module. The other power module 60 corresponds to the inverter circuit 89 and has the MOSs, the power supply relays and the shunt resistors, which form the inverter circuit 89. That is, one power module 60 corresponds to an inverter circuit of one system. That is, one power module 60, which forms one inverter circuit, is provided to one heat radiation block 51 in each power supply system.

A thin heat radiation sheet, which is not shown, is provided between the power module 60 and the heat sink 50. The power module 60 is screw-fitted by screws 69 to the heat sink 50 together with the heat radiation sheet. Thus, the power module 60 is fixed to the heat sink 50 through the heat radiation sheet so that heat generated by current supply is radiated to the heat sink 50 through the heat radiation sheet. Although not shown, a part of the wiring pattern is exposed partly as a metallic heat radiation part from the mold part 61 on the surface of the power module 60, which is at the heat sink 50 side. Heat is thus radiated efficiently, because the metallic heat radiation part contacts the heat sink 50 through the heat radiation sheet. The heat radiation sheet conducts heat from the power module 60 to the heat sink 50 and ensures insulation between the power module 60 and the heat sink 50. That is, the heat radiation sheet functions as a heat radiation member and an insulator.

The power circuit substrate 70 is a substrate of four layers, which is made of glass epoxy plate, for example, and is formed in a generally square plate shape so that it is within the motor case area. The power circuit substrate 70 has thick pattern copper foils. Four corners of the power circuit substrate 70 have four notches 71 to assure spaces for connection parts 55 of the heat sink 50. The power circuit substrate 70 is screw-fitted to the heat sink 50 by screws 72 from a side, which is opposite to the motor 2.

Figure 19:
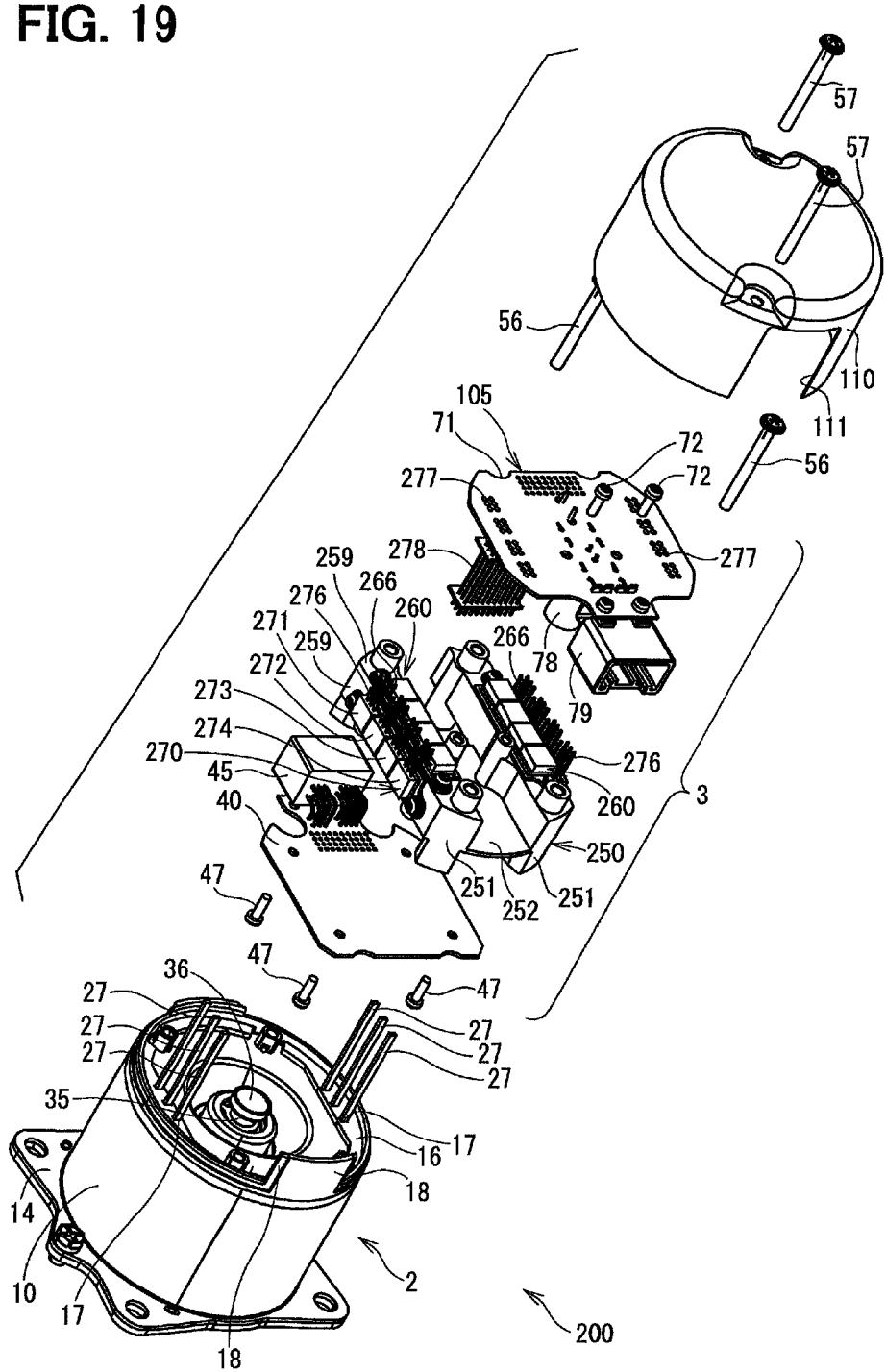
FIG. 19 is an exploded perspective view of a drive apparatus according to a second embodiment of the present invention.

Power supply wirings are formed on the power circuit substrate 70 to supply the drive currents for the winding wires 26. Wires shown by two-dot chain lines in FIG. 19 and components enclosed in a two-dot chain line in FIG. 19 are mounted on the power circuit substrate 70.

Through holes 73 are formed on the power circuit substrate 70 so that the power terminals 65 of the power module 60 are inserted. Through holes 74 are formed outside the through holes 73 on the power circuit substrate 70 so that the motor leads 27 are inserted. The motor leads 27 are inserted into the through holes 74 and electrically connected to the power circuit substrate 70 by soldering or the like. The motor leads 27 are thus connected electrically to the power module 60 through the power circuit substrate 70. That is, the power circuit substrate 70 provides a connection part of the motor leads 27 and the power module 60. The motor leads 27 are connected to the power module 60 at the opposite side of the motor case 10 relative to the mold part 61 of the power module 60 in the axial direction of the motor case 10. The motor leads 27 are connected to the power module 60 at the opposite side of the motor 2 relative to the mold part 61 of the power module 60 in the axial direction of the motor 2.

The choke coil 76, the capacitors 77 and 78, and a power connector 79 are mounted on a surface of the power circuit substrate 70 on the motor 2 side forming a power unit 105. The power unit 105 and the power module 60 form the power circuit 100.

Figure 16:
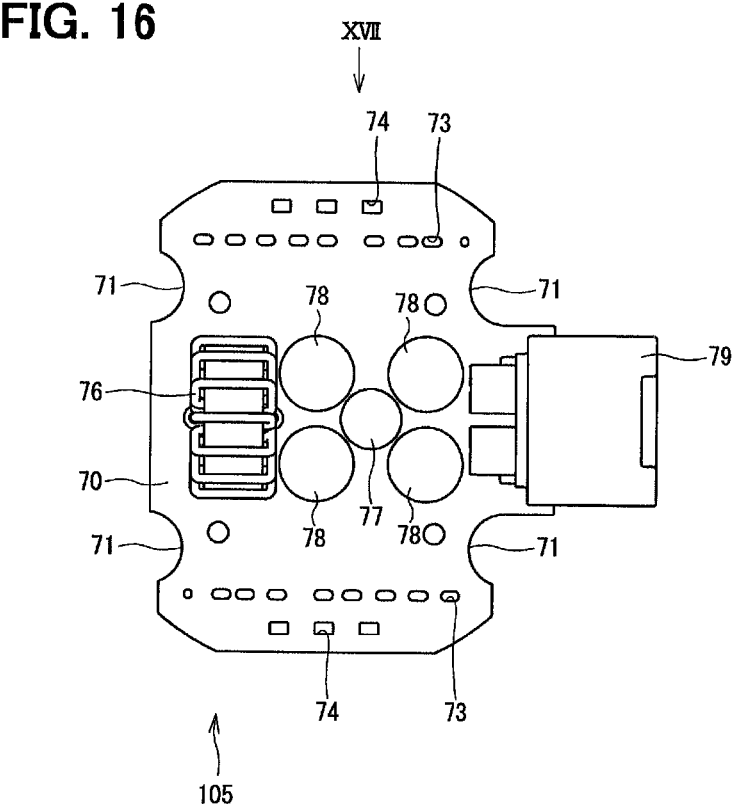
FIG. 16 is a plan view of a power unit according to the first embodiment of the present invention.
Figure 17:
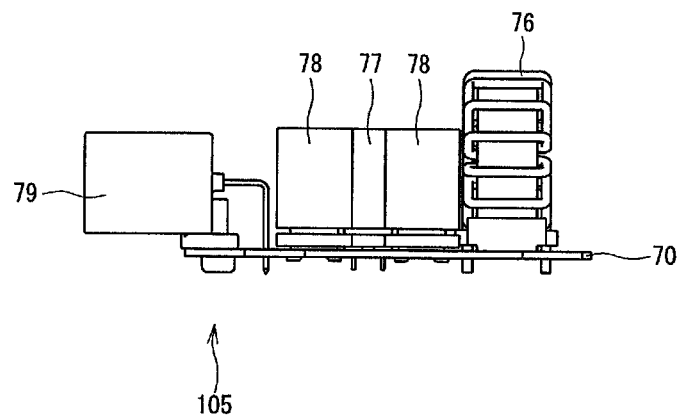
FIG. 17 is a side view of the power unit viewed in a direction XVII in FIG. 16.
Figure 18:
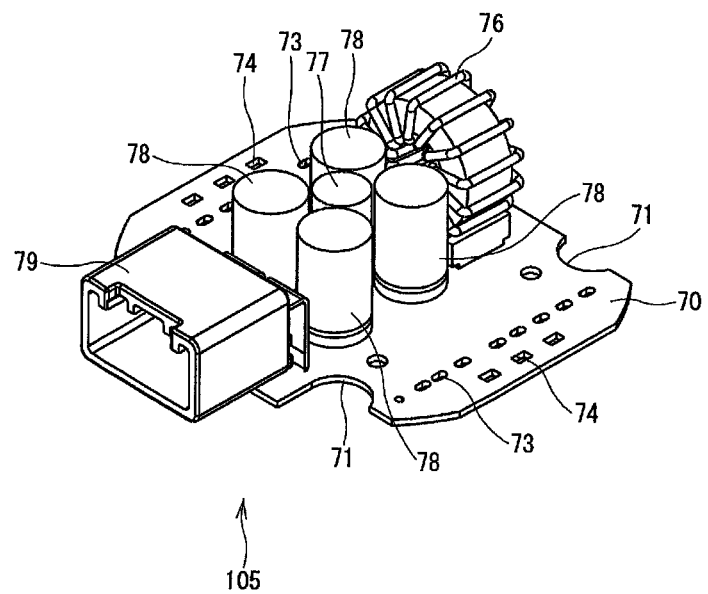
FIG. 18 is a perspective view of the power unit according to the first embodiment of the present invention.

The power unit 105 is arranged as shown in FIGS. 16 to 18.

The choke coil 76, the capacitors 77 and 78, the power connector 79, which form the power unit 105, are arranged in a space sandwiched between two heat radiation blocks 51.

The choke coil 76, the capacitors 77, 78 and the power connector 79 are arranged in a space between the connection part 52 of the heat sink 50 and the power circuit substrate 70 in the axial direction of the motor 2. The choke coil 76, the capacitors 77, 78 and the power connector 79 are arranged linearly in this order from the control connector 45 connected to the control circuit substrate 40.

The choke coil 76 is shaped in a hollow cylinder shape to have a length in its axial direction shorter than a length in its radial direction. When viewed in the axial direction of the motor 2, the choke coil 76 and the shaft 35 are located in such a manner that they are not overlapped with each other. Further, the choke coil 76 is arranged longitudinally in such a manner that the axial line of the choke coil 76 is generally perpendicular to the axial line of the shaft 35.

The capacitor 77 is located at a substantial center among four capacitors 78. The four capacitors 78 are arranged to closely surround the capacitor 77. The capacitors 77 and 78 are aluminum electrolytic capacitors. The capacitors 78 have larger capacitance than the capacitor 77. The capacitors 77 and 78 are not limited to the aluminum electrolytic capacitors, and any capacitors with appropriate capacitances can be used.

The power connector 79 is located opposite to the control connector 45, which is connected to the control circuit substrate 40. The power connector 79 is configured to be connectable with wirings from a radially outside of the motor 2, and is connected to the power source 75. Thus, electric power from the power source 75 is supplied to the power circuit substrate 70 through the power connector 79. The electric power from the power source 75 is supplied to the winding wires 26 wound on the stator 20 through the power connector 79, the power circuit substrate 70, the power module 60 and the motor leads 27.

The electronic control unit 3 is accommodated within the cover 110 (see FIGS. 5 and 6). The cover 110 is formed of magnetic material such as iron to prevent electric field and magnetic field from leaking from the electronic control unit 3 side to an external side and prevent dust from entering into the electronic control unit 3 side. The cover 110 has generally the same diameter as the motor case 10 and formed in a bottomed cylindrical shape, which opens to the motor 2 side. The cover 110 is screw-fitted to the motor case 10 together with the heat sink 50 by screws 57. Notches 111 are formed in the cover 110 at positions, which correspond to the control connector 45 and the power connector 79. The control connector 45 and the power connector 79 protrude from the notches 111 in the radial direction and open radially in different outward directions, for example, in opposite directions. A protrusion part 18 is formed on the resin guide 16 at a position, which corresponds to the notch 111 of the power connector 79 side. A step part 19 is formed on the resin guide 16 to be fitted with the cover 110.

The operation of the drive apparatus 1 will be described below.

The microcomputer 94 provided on the control circuit substrate 40 generates a pulse signal through the pre-driver circuit 91, which is formed by PWM control, to assist vehicle steering by the steering wheel 5 in accordance with a travel speed of a vehicle based on signals supplied from the position sensor 93, the torque sensor 8, the shunt resistors 99 and the like.

This pulse signal is outputted to the inverter circuits 80 and 89 of the two power supply systems formed by the power modules 60 through the control terminals 64 so that on/off switching operation of the MOSs 81 to 86 of the power modules 60 are controlled. Thus sinusoidal wave currents, which are phase-shifted one another, are supplied to the winding wires 26 so that a rotating magnetic field is generated. The rotor 30 and the shaft 35 are rotated as a single body by the rotating magnetic field. With rotation of the shaft 35, driving force is outputted from the output end 37 to the gear 7 of the column shaft 6 so that steering operation of a driver by the steering wheel 5 is assisted.

That is, the currents flowing in the winding wires 26 are supplied for driving the motor 2. The currents flowing in the winding wires 26 are the drive currents of the motor 2.

Heat generated at the time of switching the MOSs 81 to 86 of the power module 60 is radiated to the heat sink 50 through the heat radiation sheet. Thus, failure or erroneous operation, which will otherwise be caused by temperature rise of the power module 60, is suppressed.

The size of the stator 20, the rotor 30 and the like may be set in accordance with required output power.

The drive apparatus 1 according to the present embodiment provides the following advantages.

(1) The heat sink 50 has two heat generating blocks 51. On each block 51, one power module 60, which forms one of inverters 60 and 89, is arranged. Thus heat can be radiated from the power module 60 in a balanced manner. Since the power module 60 is arranged on each of the heat radiation blocks 51, which are distanced, it is prevented that one power module 60 is affected thermally by the other power module 60. By arranging the power modules 60 at different positions, it is possible to suppress simultaneous occurrence of failure in both of two power supply systems, in comparison to a case in which the power modules are arranged collectively at nearby positions. The power modules 60 are arranged with the heat sink 50 at a position in the axial direction of the motor case 10. Thus, the drive apparatus can be reduced in size in the radial direction.

(2) The heat radiation block 51 is formed in a wide column shape. The heat radiation block 51 has connection parts 54 and 55 at its both ends. The connection parts 54 and 55 are formed respective through holes, which penetrate the connection parts in the axial direction of the motor 2. In the connection parts 54, the screws 56 are threaded and fixed to the motor case 10. In the connection parts 55, the screws 57 are threaded to the motor case 10 together with the cover 110. Thus, the heat sink 50 can be fixed to the motor case 10 easily.

(3) The two heat radiation blocks 51 are arranged symmetrically relative to the center of the shaft 35 as a reference. With such heat radiation blocks 51, designing arrangement and mounting work of the power modules 60 can be attained in reduced time.

(4) The power modules 60 are arranged along the heat receiving surfaces 59 of the heat sink 50. That is, the power modules 60 are arranged longitudinally at the outside of the heat sink 50 in the radial direction of the motor 2. The power modules 60 have the same specification. The control terminals 64 and the power terminals 65 of the power modules 60 are in point-symmetry relative to the center of the shaft 35 as a reference, when viewed in the axial direction. Therefore, it is advantageous in that the two power modules need not be distinguished.

It is however possible to arrange such that the control terminals 64 and the power terminals 65 of the power modules 60 are in line-symmetry relative to the center of the shaft 35 as the reference. In this case, since the terminals of the two semiconductor modules are aligned in the same order when viewed in the axial direction, routing of wires can be simplified.

(5) The choke coil 76 is arranged within a space formed between the heat radiation blocks 51. In the space provided between the heat radiation blocks 51, comparatively large-sized electronic components, such as the smoothing capacitor 77, the electrolytic capacitors 78 and the control connectors 45, 79 are arranged. Thus, the space can be used efficiently and the entire size of the apparatus can be reduced in size.

Second Embodiment

Figure 20:
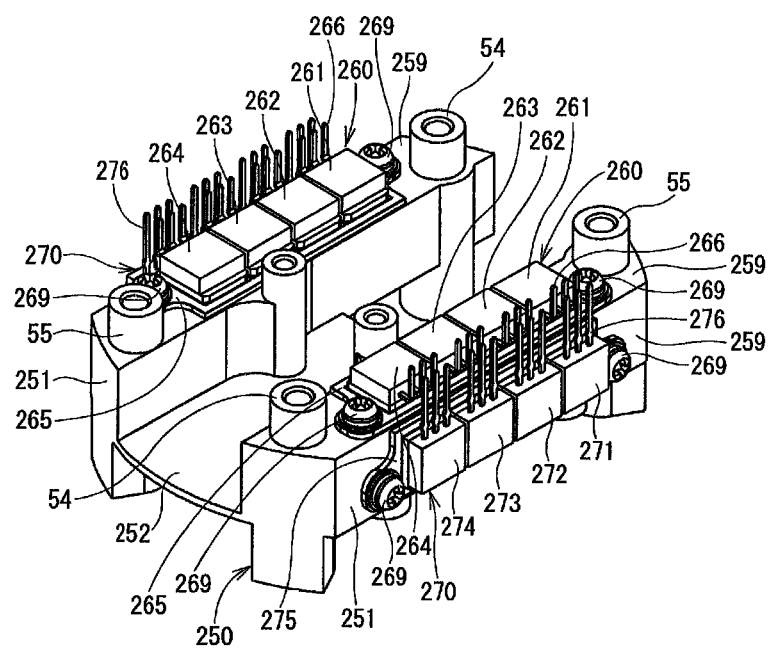
FIG. 20 is a perspective view of a heat sink, in which a power module is assembled to the heat sink, according to the second embodiment of the present invention.

A drive apparatus 200 according to a second embodiment is shown in FIGS. 19 and 20. Similarly to the first embodiment, in the drive apparatus 200, a heat sink 250 has two heat radiation blocks 251 as column-shaped parts formed to be distanced or spaced apart from each other. A connection part 252 is provided between the two heat radiation blocks 251. The two heat radiation blocks 251 and the connection part 252 are formed integrally of good thermal conductivity, for example, aluminum. A radially outside surface of the heat sink 250 in the radial direction of the motor case 10, and a surface located on the power circuit substrate 70 side provide heat receiving surfaces 259. Each of the heat radiation blocks 251 has two module units 260 and 270. One module unit 260 is located on a surface of the heat radiation block 251 facing the power circuit substrate 70. That is, the module unit 260 is arranged generally parallel to the end surface wall 13 formed in the axial direction of the motor case 10. The other module unit 270 is on a surface of the heat radiation block 251, the surface is arranged radially outside of the motor 2 in the radial direction of the motor 2, and is arranged in the rising direction of the end surface wall 13 formed in the axial direction of the motor case 10. That is, the module unit 270 is located in the longitudinal direction relative to the end surface wall 13 formed in the axial direction of the motor case 10.

The module unit 260 has four semiconductor modules 261 to 264 and a wiring substrate 265 (having an insulation layer on the aluminum surface). Each of the semiconductor modules 261 to 264 is formed with three terminals 266 on a narrow surface, which is perpendicular to a wide surface. The terminals 266 of the semiconductor modules 261 to 264 are arranged to protrude in the radially outward direction of the motor 2. The terminals 266 are bent at generally a right angle toward the power circuit substrate 70 side.

The module unit 270 has four semiconductor modules 271 to 274 and a wiring substrate 275. Each of the semiconductor modules 271 to 274 has three terminals 276 on a narrow surface, which is perpendicular to a wide surface. The terminals 276 are arranged on the power circuit substrate 70 side.

The terminals 266 of the semiconductor modules 261 to 264 and the terminals 276 of the semiconductor modules 271 to 274 are inserted into through holes 277 formed on the power circuit substrate 70 and electrically connected to the power circuit substrate 70 by soldering or the like.

The motor leads 27 are inserted into through holes, which are not shown and are formed outside the through holes 277 on the power circuit substrate 70, and are electrically connected to the power circuit substrate 70 by soldering or the like. Thus, the motor leads 27 are connected to the power module units 260 and 270 through the power circuit substrate 70.

Similarly to the first embodiment, the power circuit substrate 70 forms a connection part for connecting the motor leads 27 and the power module 60. The motor leads 27 are connected to the power module 60 at the opposite side of the motor case 10 relative to the mold part 61 of the power module 60 in the axial direction of the motor case 10. That is, the motor leads 27 are connected to the power module 60 at the opposite side of the motor 2 relative to the mold part 61 of the power module 60 in the axial direction of the motor 2.

The module units 260 and 270 are screw-fitted to the heat sink 250 by screws 269. The wiring substrates 265 and 275, on which the semiconductor modules 261 to 264 and 271 to 274 are mounted, are made of aluminum and the outside surface is made of resin layer. The resin layer functions as an insulation layer to assure the semiconductor modules 261 to 264 and 271 to 274 are insulated from the heat sink.

According to the present embodiment, in the module unit 260, the semiconductor modules 261 to 264 are mounted on the wiring substrate 265. In the module unit 270, the semiconductor modules 271 to 274 are mounted on the wiring substrate 275. The module units 260 and 270 are screw-fitted to the heat sink 250. Alternatively, the semiconductor modules 261 to 264 and 271 to 274 may be fitted to the heat sink 250 without the wiring substrates 265 and 275. In this case, insulation sheets need to be provided between the semiconductor modules 261 to 264 and the heat sink 250, and between the semiconductor modules 271 to 274 and the heat sink 250. Alternatively, a semiconductor module, in which drain electrodes are coated with resin for insulation purpose, may be used when the insulation sheets are not provided.

The semiconductor modules 261 to 264 and 271 to 274 form power modules and the terminals 266 and 276 form the terminal parts.

Each of the semiconductor modules 261 to 264 and 271 to 274, which form the module units 260 and 270, has one MOS. The module units 260 and 270 arranged in the longitudinal direction and radially outside of one heat radiation block 251 correspond to the first inverter circuit 80. The module units 260 and 270 arranged on the other heat radiation block 251 correspond to the second inverter circuit 89. Thus, one power module 60, which forms one power supply system, is arranged relative to one heat radiation block 51. Similarly to the first embodiment, the inverter circuit 80 and the inverter circuit 89 are similar to each other, and only the module units 260 and 270 corresponding to the inverter circuit 80 will be described.

In the module unit 260, which is located on the surface of the heat radiation block 251 facing the power circuit substrate 70, the semiconductor module 261 has the power supply relay 87, the semiconductor module 262 has the MOS 81, the semiconductor module 263 has the MOS 82 and the semiconductor module 264 has the MOS 83. That is, the module unit 260 has MOSs 81 to 83, which are arranged on the power supply line side, and one power supply relay 87. The module unit 260 has MOSs 81 to 83, which are arranged on the power supply line side, and form the upstream (high potential) side circuit.

In the module unit 270, which is located longitudinally on the surface of the heat radiation block 251 at the radially outside position, the semiconductor module 271 has the power supply relay 88, the semiconductor module 272 has the MOS 84, the semiconductor module 273 has the MOS 85 and the semiconductor module 274 has the MOS 86. That is, the module unit 270 has MOSs 84 to 86, which are arranged on the ground line side, and one power supply relay 88. The module unit 270 has MOSs 84 to 86, which are arranged on the ground line side, and form the downstream (low potential) side circuit.

The semiconductor module 262, which has the MOS 81 connected to the U-phase coil, and the semiconductor module 272, which has the MOS 84 connected to the U-phase coil, are formed to sandwich a periphery side line of the heat radiation block 251. The periphery side line of the heat radiation block 251 is located radially outside facing the power circuit substrate 70 side. Similarly, the semiconductor module 263, which has the MOS 82 connected to the V-phase coil, and the semiconductor module 273, which has the MOS 85 connected to the V-phase coil, are formed to sandwich the periphery side line of the heat radiation block 251. The periphery side line of the heat radiation block 251 is located radially outside facing the power circuit substrate 70 side. Similarly, the semiconductor module 264, which has the MOS 83 connected to the W-phase coil, and the semiconductor module 274, which has the MOS 86 connected to the W-phase coil, are formed to sandwich the periphery side line of the heat radiation block 251. The periphery side line of the heat radiation block 251 is located radially outside facing the power circuit substrate 70 side. Further, the semiconductor module 261, which has the power supply relay 87, and the semiconductor module 271, which has the power supply relay 88, are formed to sandwich the periphery side line of the heat radiation block 251. The periphery side line of the heat radiation block 251 is located radially outside facing the power circuit substrate 70 side. By this arrangement, wiring loss can be reduced.

The semiconductor modules 261 to 264 and 271 to 274 do not have terminals, which directly connect to the control circuit substrate 40. Therefore, the control circuit substrate 40 and the power circuit substrate 70 are electrically connected by way of substrate connecting terminals 278. The control circuit substrate 40 and the semiconductor modules 261 to 264 and 271 to 274 are electrically connected by way of substrate connection terminals 278 and the power circuit substrate 70. Control signals outputted from the control circuit substrate 40 are supplied to the semiconductor modules 261 to 264 and 271 to 274 by way of the substrate connecting terminals 278 and the power circuit substrate 70 to control on/off of the MOSs in the semiconductor modules 261 to 264 and 271 to 274. Thus, driving the motor 2 is controlled in the similar manner as in the first embodiment.

The drive apparatus 200 according to the second embodiment provides advantages similar to the above-described advantages (1) to (5).

Further, in the present embodiment, the semiconductor modules 261 to 264 and 271 to 274, which are resin-molded in correspondence to respective MOSs, are used. Thus, the module, which corresponds to one power supply system, is not used. The semiconductor modules 261 to 264 and 271 to 274 are arranged on the surface of the heat sink 250, which faces the power substrate 70. Thus, space can be used efficiently and the apparatus can be reduced in size.

Third Embodiment

Figure 23:
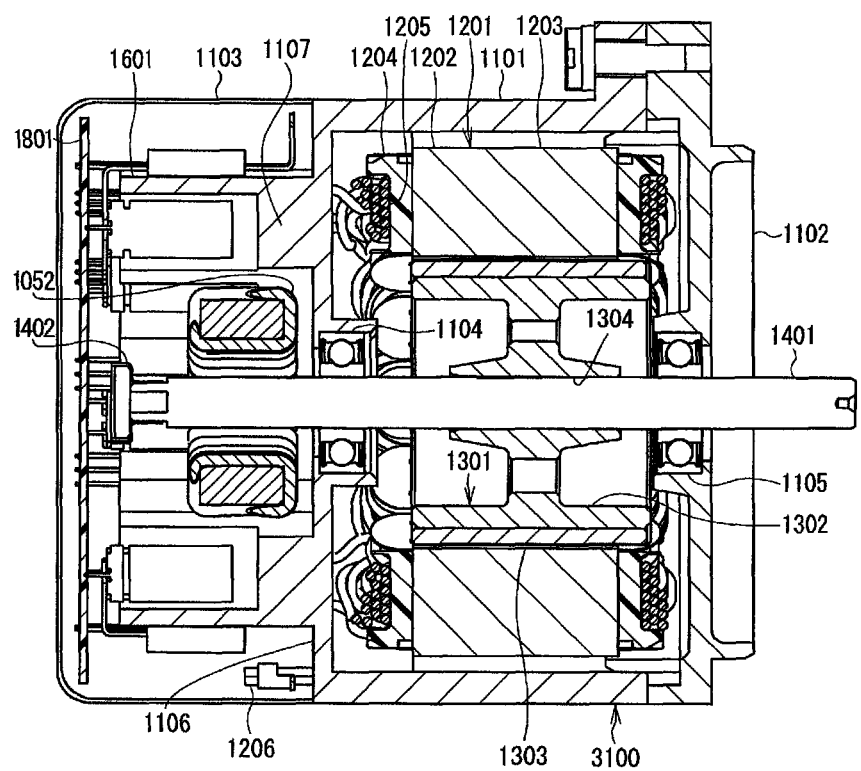
FIG. 23 is a cross-sectional view of the drive apparatus taken along a line XXIII-XXIII in FIG. 22.

A drive apparatus 1001 according to a third embodiment has, as shown in FIG. 23, a housing that includes a cylindrical motor case 1101, an end frame 1102 that is screwed to the output end of the motor case 1101, and a bottomed cylindrical cover 1103 that is installed over an electronic control unit.

A motor 1030 includes the motor case 1101, a stator 1201 positioned on the radially inside part of the motor case 1101, a rotor 1301 positioned on the radially inside part of the stator 1201, and a shaft 1401 that rotates together with the rotor 1301.

The stator 1201 includes twelve salient poles 1202, which protrude in the radially inward direction of the motor case 1101. The salient poles 1202 are disposed at predetermined intervals in the circumferential direction of the motor case 1101. The salient poles 1202 each include a multilayer core 1203, which is provided by stacking a number of thin magnetic plates, and an insulator 1204, which fits with the axially outer end of the multilayer core 1203. Winding wires 1205 are wound about the insulator 1204. Motor leads 1206 for supplying electric current to the winding wires 1205 are connected to six points of the winding wires 1205. The winding wires 1205 function as a three-phase coil that has a U-phase, a V-phase and a W-phase depending on the mode of electrical current supply to the motor leads 1206. The winding wires 1205 are configured as a three-phase coil having the U-phase, V-phase, and W-phase. The motor leads 1206 are routed from six holes in an axial end wall 1106 of the motor case 1101 toward the electronic control unit.

The rotor 1301 is made, for instance, of iron or other magnetic material and formed into tubular shape. The rotor 1301 includes a rotor core 1302 and permanent magnets 1303 positioned on the radially outside part of the rotor core 1302. The permanent magnets 303 include N and S poles, which are alternately provided in the circumferential direction.

The shaft 1401 is fastened to a shaft hole 1304 formed at the axial center of the rotor core 1302. The shaft 1401 is rotatably supported by a bearing 1104 on the motor case 1101 and by a bearing 1105 on the end frame 1102. This ensures that the shaft 1401 can rotate together with the rotor 1301 relative to the stator 1201. The bearing 1104 is positioned at the boundary between the electronic control unit (drive control circuit) and the motor (movable part). A wall at this boundary is an end wall 1106 of the motor case 1101. The shaft 1401 is extended from the end wall 1106 toward the electronic control unit, and includes a magnet 1402 that is positioned at its end toward the electronic control unit to detect the rotational position. A printed circuit board 1801 made of resin is positioned near the end of the shaft 1401 that is positioned toward the electronic control unit. The position sensor 93 is mounted at the center of the printed circuit board 1801 to detect the rotational position of the magnet 1402, that is, the rotational position of the shaft 1401.

Figure 21:
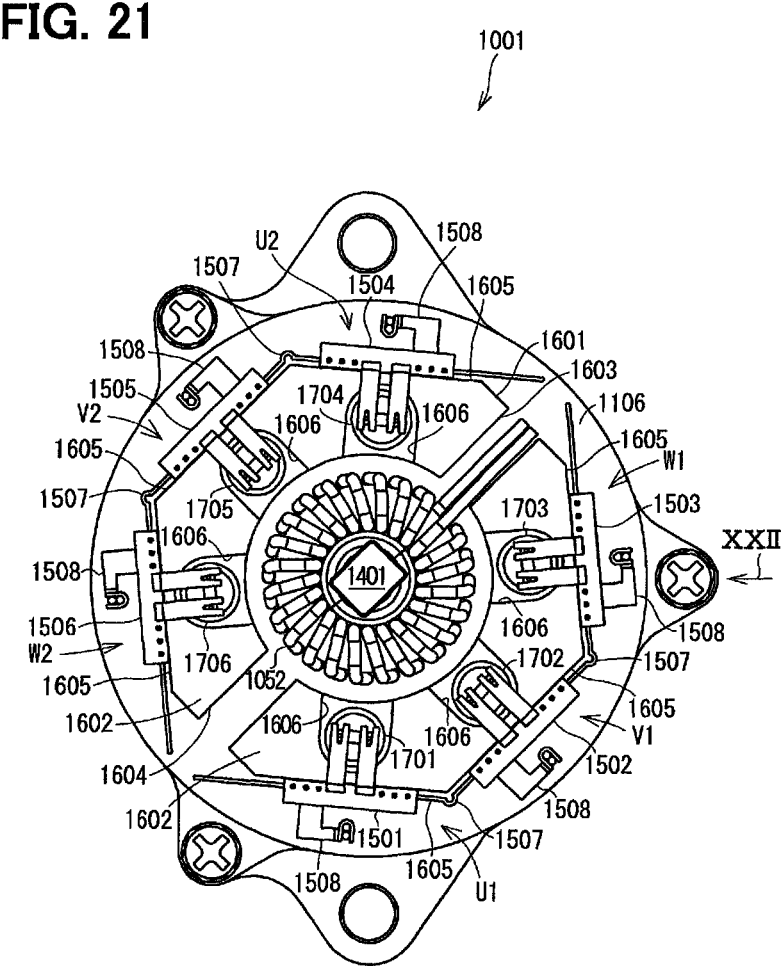
FIG. 21 is a plan view of a drive apparatus according to a third embodiment of the present invention.
Figure 22:
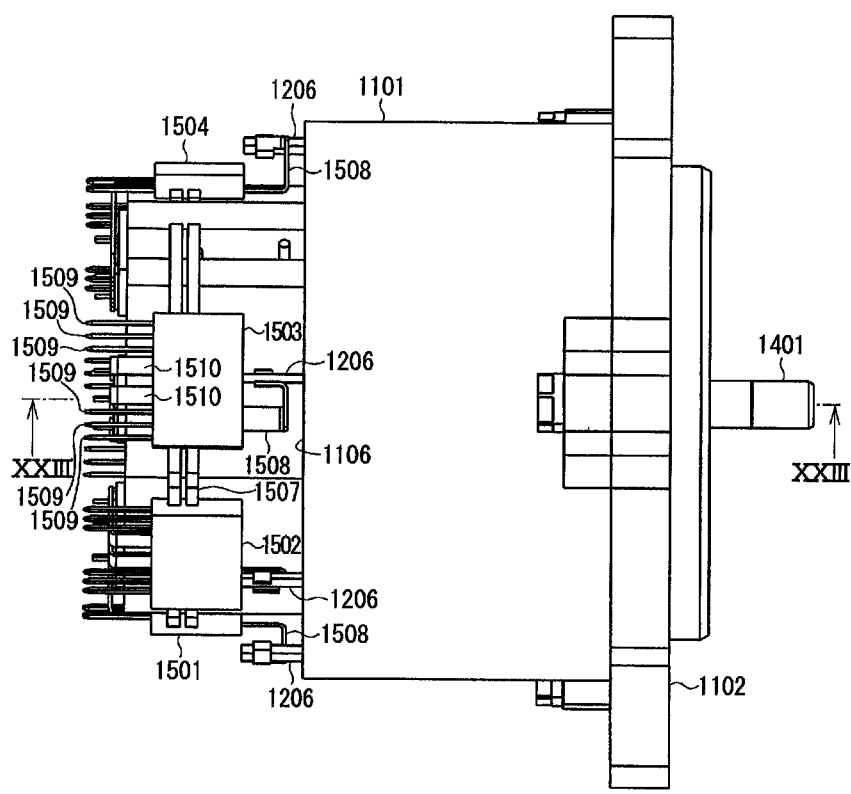
FIG. 22 is a side view of the drive apparatus according to the third embodiment of the present invention.
Figure 24:
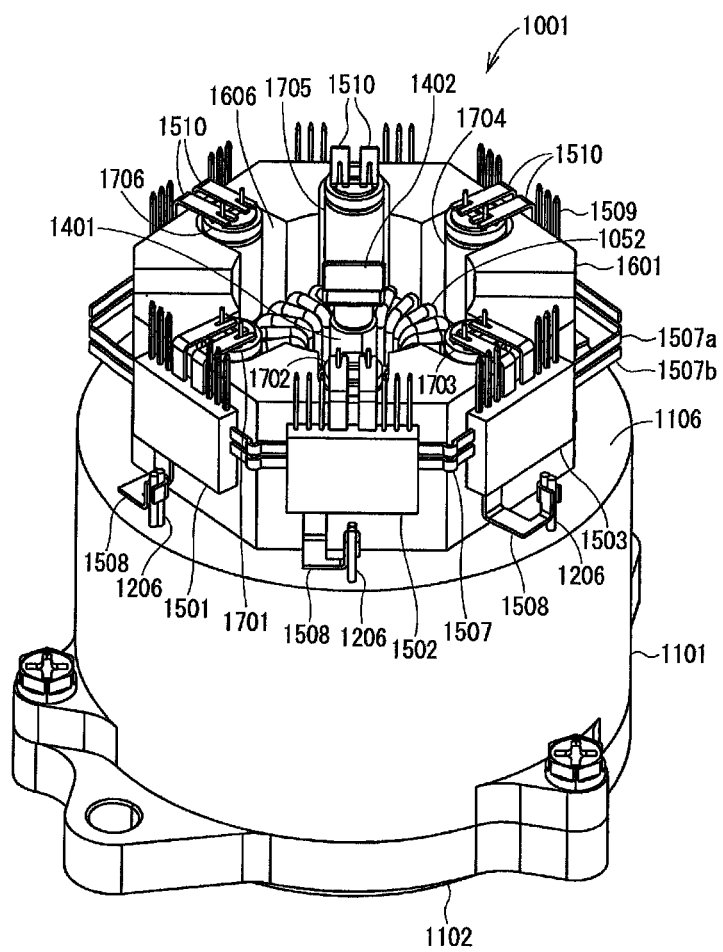
FIG. 24 is a perspective view of the drive apparatus according to the third embodiment of the present invention.
Figure 25:
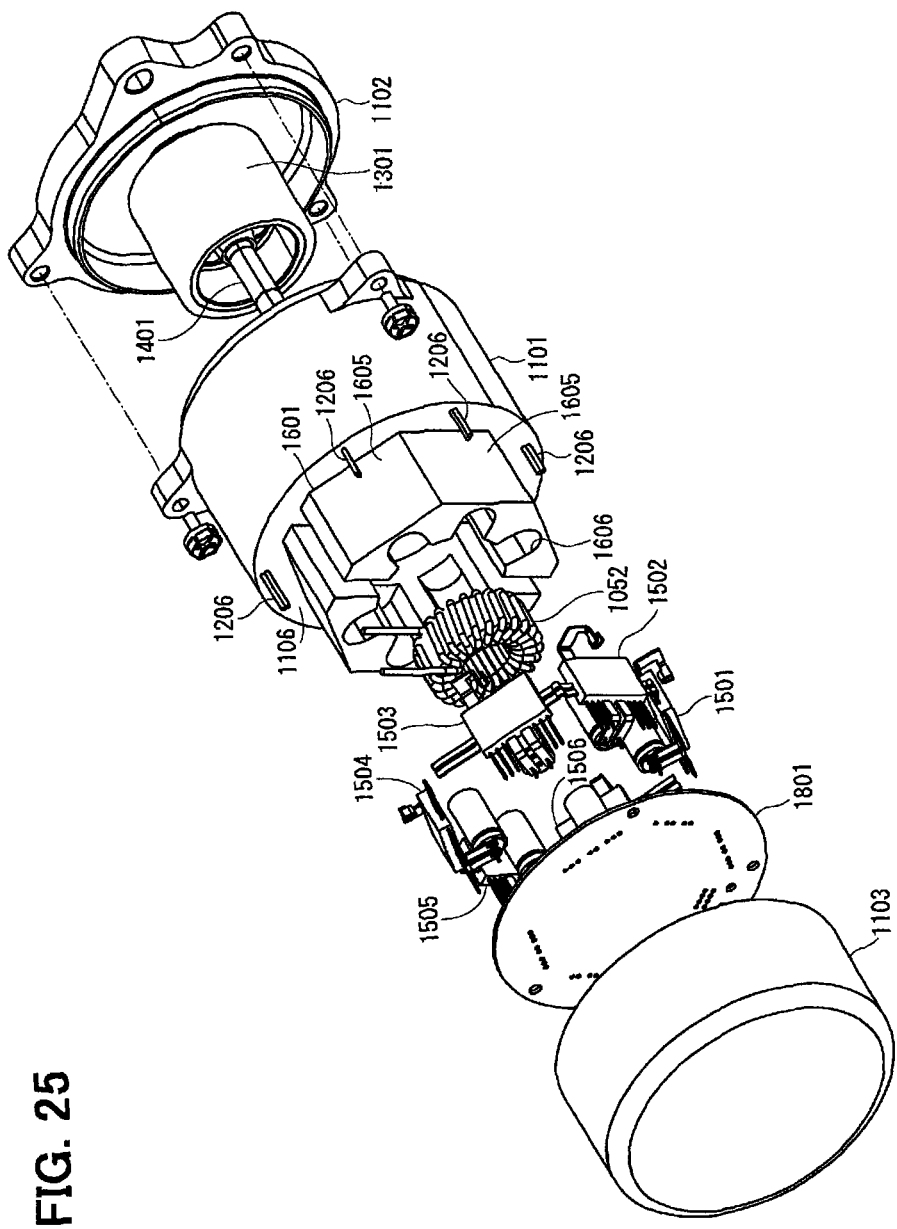
FIG. 25 is an exploded perspective view of the drive apparatus according to the third embodiment of the present invention.

Configuration of the electronic control unit is described next with reference to FIGS. 21 to 25. In FIGS. 21, 22 and 24, the cover 1103 and the printed circuit board 1801 are not illustrated.

As shown in FIG. 21, the drive apparatus 1001 includes six semiconductor modules 1501, 1502, 1503, 1504, 1505 and 1506. Alphabetical symbols in FIG. 21 are used to distinguish the semiconductor modules 1501 to 1506 from each other. More specifically, the semiconductor modules 1501 to 1506 are individually referred to as the U1 semiconductor module 1501, the V1 semiconductor module 1502, the W1 semiconductor module 1503, the U2 semiconductor module 1504, the V2 semiconductor module 1505, and the W2 semiconductor module 1506.

The U1, V1, W1 semiconductor modules 1501 to 1503 and the U2, V2, W2 semiconductor modules 1504-1506 are connected via bus bars 1507 to form a module unit. The bus bars 1507 have coupling function. A bus bar 1507a positioned apart from the motor case 1101 is provided as a ground, whereas the bus bar 1507b positioned close to the motor case 1101 is provided as a power supply line (FIG. 24). Thus, electrical power is supplied to the semiconductor modules 1501 to 1506 through the bus bars 1507.

The U1, V1, W1 semiconductor modules 1501 to 1503 form one inverter circuit, and the U2, V2, W2 semiconductor modules 1504 to 1506 form the other inverter circuit. The drive apparatus 1001 operates with two power supply systems.

FIGS. 21 to 25 illustrate the assembling structures, for instance, of the semiconductor modules 1501 to 1506, but do not illustrate an electrical power supply structure. In reality, however, electrical power is supplied to the bus bars 507 through a connector mounted on the cover 1103.

The semiconductor modules 1501 to 1506 are mounted on a heat sink 1601 that is extended in the same direction as the direction of the central line of the shaft 1401 from the end wall 1106 of the motor case 1101.

As shown in FIG. 21, the heat sink 1601 is configured so that two column-shaped parts, whose cross sections perpendicular to the axial direction are substantially trapezoidal in shape, are disposed so as to sandwich the central line of the shaft 1401. Further, a predefined radial portion is cut out to form a cylindrical space at the center. As a whole, the heat sink 1601 looks like a thick-walled cylinder that is octagon-shaped when viewed in the axial direction. Of course, the heat sink 601 need not always be octagon-shaped when viewed in the axial direction. Alternatively, it may be hexagon-shaped when viewed in the axial direction. The heat sink 1601 has side walls 1602 that form the column-shaped parts that are substantially trapezoidal in shape when viewed cross-sectionally in the axial direction. The side walls 1602 include cut-out portions 1603, 1604, which form a noncontiguous portion. The heat sink 1601 is formed integrally with the motor case 1101.

The side walls 1602 of the heat sink 1601 have side wall surfaces 1605, which are wider than a side surface that faces in a radially outward direction and is positioned adjacent to the cut-out portions 1603, 1604. A total of six side wall surfaces 1605 are formed circumferentially. Accommodation spaces 1606 are formed in the radially inward direction of the individual side wall surfaces 1605 and open to a cylindrical space at the center. The accommodation space 1606 has an arc surface that fits to the outer shape of a capacitor. Further, the accommodation space 1606 is in a position that corresponds to the position of the side wall surface 1605. Although a portion of the heat sink 1601 on which the accommodation spaces 1606 are formed is thin, a thick portion 1107, which is as thick as a portion where the accommodation spaces 1606 are not provided, is formed between the accommodation spaces 1606 and the end wall 1106 of the motor case 1101.

The semiconductor modules 1501 to 1506 are disposed, one by one, on the side wall surfaces 1605, which face the radially outside of the heat sink 1601. The semiconductor modules 1501 to 1506 are shaped like a plate that is extended in the planar direction of a molded semiconductor chip, and one of the respective surfaces having a relatively large area serves as a heat dissipation surface. For example, copper or other metal is exposed from the heat dissipation surface. The semiconductor modules 1501 to 1506 are disposed such that the respective heat dissipation surfaces are in contact with the side wall surfaces 1605. In this instance, the side wall surfaces 1605 are plane surfaces. Accordingly, the heat dissipation surfaces of the semiconductor modules 1501 to 1506 are also plane surfaces. An alternative configuration may be employed so that an insulation sheet is placed between the heat dissipation surface of each semiconductor modules 1501 to 1506 and the side wall surface 1605 of the heat sink 1601.

As the semiconductor modules 1501 to 1506 are disposed on the side wall surfaces 1605 of the heat sink 1601 as described above, a vertical line perpendicular to a flat surface of a semiconductor chip is perpendicular to the central line of the shaft 1401. Thus, the semiconductor modules 1501 to 1506 according to the present embodiment are longitudinally disposed.

The semiconductor modules 1501 to 1506 include coil terminals 1508 that are mounted on the end part at the motor case 1101 side (FIG. 22). The coil terminals 1508 are bent in the radially outward direction. Motor leads 1206 for supplying electrical current to the winding wires 1205 are routed toward the electronic control unit through six holes in the end wall 1106 of the motor case 1101. The motor leads 1206 are routed into a radially outer space of the semiconductor modules 1501 to 1506. In the radially outer space of the semiconductor modules 1501 to 1506, therefore, the motor leads 1206 and coil terminals 1508 are electrically connected such that the motor leads 1206 are sandwiched between the coil terminals 1508.

The semiconductor modules 1501 to 1506 also include six control terminals 1509 and two capacitor terminals 1510, which are positioned on the end surface opposite to the motor case 1101. The control terminals 1509 are inserted into through holes in a printed circuit board 1801 (FIG. 23) and then soldered. This ensures that the semiconductor modules 1501 to 1506 are electrically connected to the control circuit. Capacitor terminals 1510 are branched off from the power supply line and ground, respectively, within the semiconductor modules 1501 to 1506. Further, the capacitor terminals 1510 are both bent in the radially inward direction. As described above, the printed circuit board 1801 is positioned in a space between a leading end wall of the heat sink 1601 and the cover 1103.

As shown in, for instance, FIG. 21, six capacitors 1701 to 1702, 1703, 1704, 1705 and 1706 are provided for the semiconductor modules 1501 to 1506 and disposed on the same side as the heat sink 1601, that is, in the radially inward direction. Alphabetical symbols in FIG. 21 are used to differentiate the capacitors 1701 to 1706 from each other. More specifically, the capacitors 1701 to 1706 will be individually referred to as the U1 capacitor 1701, the V1 capacitor 1702, the W1 capacitor 1703, the U2 capacitor 1704, the V2 capacitor 1705, and the W2 capacitor 1706.

The capacitors 1701 to 1706 are accommodated in the accommodation spaces 1606 of the heat sink 1601 and positioned near the semiconductor modules 1501 to 1506, respectively. The capacitors 1701 to 1706 are cylindrical in shape, and disposed such that the respective axes are parallel to the central line of the shaft 1401 (FIG. 24). Further, the capacitor terminals 1510 of the semiconductor modules 1501 to 1506 are bent in the radially inward indirection so that the terminals of the capacitors 1701 to 1706 are directly connected to the bent capacitor terminals 1510.

The shaft 1401 is extended toward the electronic control unit. As shown, for instance, in FIG. 23, the choke coil 1052 is set such that the shaft 1401 is inserted through the choke coil 1052. The choke coil 1052 is placed in a cylindrical space formed at the center of the heat sink 1601. The choke coil 1052 is formed by winding a coil wire around a doughnut-shaped iron core. The coil end of the choke coil 1052 is passed through the cut-out portion 1603 of the heat sink 1601 and routed out in the radially outward direction (FIG. 21).

The coil end of the choke coil 1052 is connected to the power supply line in an intervening manner. However, FIGS. 21 to 25 do not illustrate electrical power supply structure for the choke coil 1052.

The third embodiment provides the advantages (1), (3) and (5) of the first embodiment.

Fourth Embodiment

Figure 26:
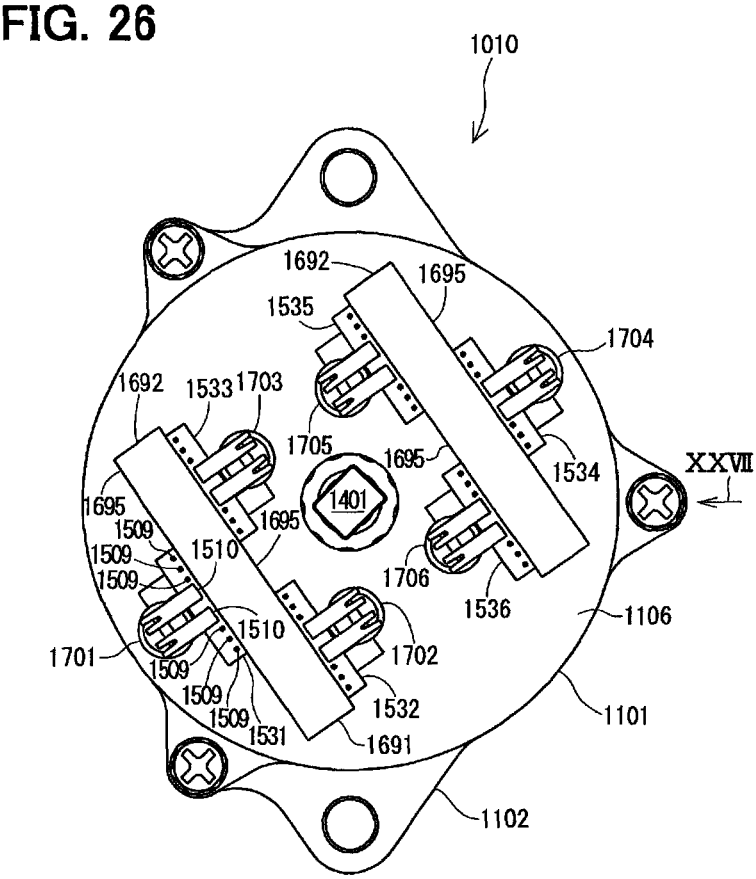
FIG. 26 is a plan view of a drive apparatus according to a fourth embodiment of the present invention.

A drive apparatus 1010 according to a fourth embodiment has six semiconductor modules 1531, 1532, 1533, 1534, 1535 and 1536 as shown in FIG. 26. The semiconductor modules 1531 to 1536 are attached to a heat sink 1691, which are extended from an end wall 1106 of a motor case 1101 in the same direction as the central line of a shaft 1401.

The heat sink 1691 is shaped, as shown in FIG. 26, to have two column-shaped parts, which are arranged to sandwich the central line of the shaft 1401. The column-shaped part has a rectangular shape in cross section taken perpendicularly to the axial direction. The heat sink 1691 has a side wall 1692 as a column-shaped part about the central line of the shaft 1401.

The side wall 1692 of the heat sink 1691 has four side wall surfaces 1695, which are perpendicular to the central line of the shaft 1401 and parallel to one another.

The six semiconductor modules 1531 to 1536 are arranged on the side wall surfaces 1695 of the heat sink 1691. Specifically, two semiconductor modules are arranged on each of two inner side wall surfaces 1695 among the four side wall surfaces 1695. That is, a total of four semiconductor modules are arranged on the two inner side wall surfaces 1695. One semiconductor module is arranged on each of two outer side wall surfaces 1695. That is, a total of two semiconductor modules are arranged on the two outer side wall surfaces.

The semiconductor modules 1531 to 1533 arranged on the side wall 1692 form one inverter circuit, and the semiconductor modules 1534 to 1536 arranged on the other side wall 1692 form the other inverter circuit.

The semiconductor modules 1531 to 1536 are arranged so that respective heat radiation surfaces contact the side wall surfaces 1695. The side wall surface 1695 is a plane surface and hence the heat radiation surface of each of the semiconductor modules 1531 to 1536 is also a plane surface. The semiconductor modules 1531 to 1536 are displaced in position between the inner side and the outer side of the side wall 1692 so that the heat radiation surfaces of the modules 1531 to 1536 do not fully face each other sandwiching the side wall 1692.

Figure 27:
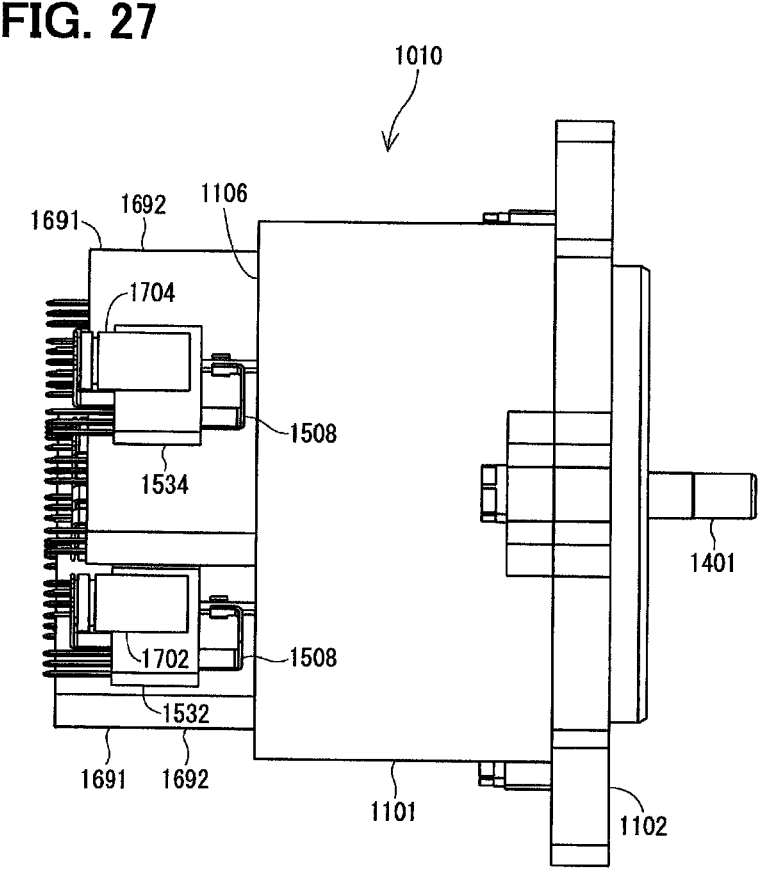
FIG. 27 is a side view of the drive apparatus according to the fourth embodiment of the present invention.
Figure 28:
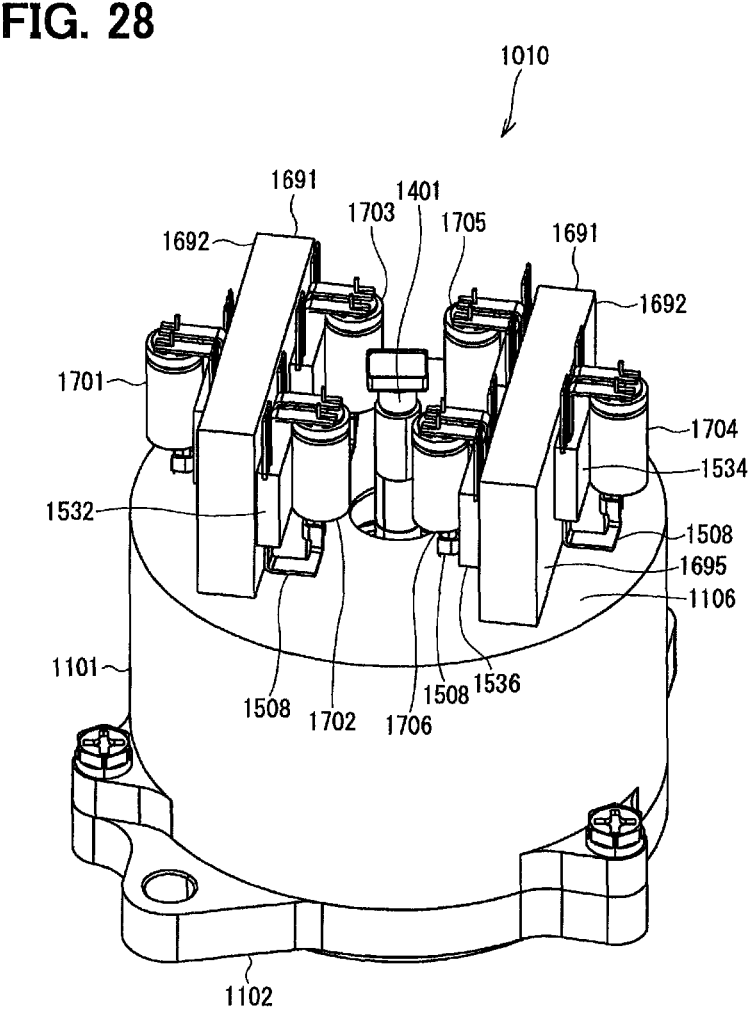
FIG. 28 is a perspective view of the drive apparatus according to the fourth embodiment of the present invention.

The semiconductor modules 1531 to 1536 has coil terminals 1508 at respective side end surfaces, which are on the motor case 1101 side (FIGS. 27 and 28). The semiconductor modules 1531 to 1536 have six control terminals 1509 and two capacitor terminals 1510 at respective side end surfaces, which are opposite from the motor case 1101 side (FIG. 26). This configuration is similar to the above-described embodiments.

As shown in FIG. 26, six capacitors 1701, 1702, 1703, 1704, 1705 and 1706 are arranged at the opposite side of the heat sink 1691 relative to the semiconductor modules 1531 to 1536.

The capacitors 1701 to 1706 are provided for the semiconductor modules 1531 to 1536 and arranged near the semiconductor modules 1531 to 1536, respectively. The capacitors 1701 to 1706 are formed in a tubular shape and arranged so that respective axes are parallel to the central line of the shaft 1401. The capacitor terminals 1510 of the semiconductor modules 1531 to 1536 are bent in the direction, which is opposite to the side wall surface 1695, and directly connected to the terminals of the capacitors 1701 to 1706.

The drive apparatus 1010 according to the fourth embodiment similarly provides the advantages (1) and (3) described in reference to the foregoing embodiments.

The present invention is not limited to the foregoing embodiments but may be implemented in a variety of embodiments without departing from the spirit of the invention.

(A) Although two inverter circuits are provided in the above-described embodiments, three or more inverters may be provided.

(B) Although the heat radiation blocks of the heat sink are formed integrally by the connection part in the first and the second embodiment, the heat radiation blocks need not be connected by the connection part but may be formed separately.

(C) Although the side walls of the heat sink are arranged symmetrically relative to the center of the shaft in the first to the fourth embodiments, the side walls need not be arranged symmetrically.

The invention claimed is:

1. A drive apparatus comprising:
a motor having a motor case formed in a cylindrical shape to define an outer periphery, a stator located radially inside the motor case and wound with winding wires to provide a plurality of phases corresponding to a U-phase, V-phase, and W-phase, a rotor located radially inside the stator and rotatable relative to the stator, and a shaft rotatable together with the rotor;
a heat sink arranged in an axial direction of the motor case and having a plurality of column-shaped parts spaced apart from one another; and
a plurality of semiconductor modules provided for a plurality of power supply systems, each of which switches over coil currents for the plurality of phases corresponding to a U-phase, V-phase, and W-phase supplied to the winding wires by a plurality of switching elements, and arranged on the plurality of column-shaped parts such that one power supply system corresponds to one column-shaped part,
wherein a part of the plurality of semiconductor modules forming the one power supply system is arranged on the one column-shaped part corresponding to the one power supply system;
the heat sink has a first column-shaped part and a second column-shaped part, as the plurality of column-shaped parts;
the plurality of power supply systems has a first power supply system and a second power supply system in correspondence to the first column-shaped part and the second column-shaped part, respectively;
the plurality of semiconductor modules has a first part of semiconductor modules forming the first power supply system and a second part of semiconductor modules forming the second power supply system; and
all the first part of semiconductor modules and all the second part of semiconductor modules are provided on the first column-shaped part and the second column-shaped part, respectively.

2. The drive apparatus according to claim 1, wherein:
each of the column-shaped parts is formed in a thick plate shape having a predetermined thickness in a radial direction.

3. The drive apparatus according to claim 2, wherein:
each of the column-shaped parts has connection parts at respective end parts, the connection parts having fixing holes provided in the axial direction.

4. The drive apparatus according to claim 3, wherein:
the heat sink has a connection part formed in a plate shape for connecting the column-shaped parts in parallel.

5. The drive apparatus according to claim 3, wherein:
the first column-shaped part and the second column-shaped parts are provided in parallel and symmetrically relative to a center of the shaft as a reference.

6. The drive apparatus according to claim 5, wherein:
each of the first part of semiconductor modules and the second part of semiconductor modules is formed as a single module, which is arranged on a surface of each of the column-shaped parts.

7. The drive apparatus according to claim 6, wherein:
the first part of semiconductor modules and the second part of semiconductor modules are arranged such that arrangement of respective terminals protruding in the axial direction are in line-symmetry and point-symmetry relative to a center of the shaft as a reference when viewed in the axial direction.

8. The drive apparatus according to claim 5, wherein:
each of the first part of semiconductor modules and the second part of semiconductor modules contacts two adjacent surfaces of the first column-shaped part and the second column-shaped parts, respectively.

9. The drive apparatus according to claim 1, wherein:
the heat sink has a connection part for connecting the column-shaped parts.

10. The drive apparatus according to claim 1, wherein:
the first column-shaped part and the second column-shaped part are provided in parallel and symmetrically relative to a center of the shaft as a reference.

11. The drive apparatus according to claim 10, wherein:
each of the first part of semiconductor modules and the second part of semiconductor modules is formed as a single module, which is arranged on a surface of each of the column-shaped parts.

12. The drive apparatus according to claim 11, wherein:
the first part of semiconductor modules and the second part of semiconductor modules are arranged such that arrangement of respective terminals protruding in the axial direction are in line-symmetry relative to a center of the shaft as a reference when viewed in the axial direction.

13. The drive apparatus according to claim 12, wherein:
the first part of semiconductor modules and the second part of semiconductor modules are arranged such that arrangement of the respective terminals protruding in the axial direction are in point-symmetry relative to the center of the shaft as a reference when viewed in the axial direction.

14. The drive apparatus according to claim 11, wherein:
each of the first part of semiconductor modules and the second part of semiconductor modules contacts two adjacent surfaces of the first column-shaped part and the second column-shaped part, respectively.

15. The drive apparatus according to claim 1, further comprising:
capacitors and a coil are arranged radially inside the column-shaped parts.

* * * * *